(12) United States Patent
Gundotra et al.

(10) Patent No.: US 9,633,016 B2
(45) Date of Patent: Apr. 25, 2017

(54) INTEGRATED SOCIAL NETWORK AND STREAM PLAYBACK

(71) Applicant: Google Inc., Mountain View, CA (US)

(72) Inventors: Vivek Paul Gundotra, Los Gatos, CA (US); Ajmal Arshan Asver, San Francisco, CA (US); Christopher Bader-Wechseler, San Francisco, CA (US); David Gary Besbris, Cupertino, CA (US); William M. Biggs, Sunnyvale, CA (US); David M. Cohen, Mountain View, CA (US); Amar Gandhi, Mountain View, CA (US); Brett Rolston Lider, San Francisco, CA (US); Noam Lovinsky, San Francisco, CA (US); Matthew Stephen Steiner, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 266 days.

(21) Appl. No.: 13/665,511

(22) Filed: Oct. 31, 2012

(65) Prior Publication Data

US 2013/0110929 A1  May 2, 2013

Related U.S. Application Data

(60) Provisional application No. 61/554,452, filed on Nov. 1, 2011.

(51) Int. Cl.
*G06F 15/16* (2006.01)
*G06F 17/30* (2006.01)
(Continued)

(52) U.S. Cl.
CPC ....... *G06F 17/30023* (2013.01); *G06Q 10/10* (2013.01); *G06Q 50/01* (2013.01);
(Continued)

(58) Field of Classification Search
USPC .............................................. 709/204; 710/1
See application file for complete search history.

(56) References Cited

U.S. PATENT DOCUMENTS 7,558,797 B2 * 7/2009 Li
7,680,882 B2 * 3/2010 Tiu et al. .................... 709/203
(Continued)

FOREIGN PATENT DOCUMENTS

WO  WO2008121967  10/2008
WO  WO2011100624  8/2011

OTHER PUBLICATIONS

International Search Report, PCT/US12/063105, Jan. 18, 2013, 7 pgs.
(Continued)

*Primary Examiner* — Hua Fan
(74) *Attorney, Agent, or Firm* — Patent Law Works LLP

(57) ABSTRACT

A system and method for searching and playing multimedia content on a social network portal is disclosed. The system and method includes hosting a social network portal of a user, wherein the social network portal displays information of the user. The method further includes integrating, on the social network portal of the user, a multimedia controller. A selection or mouse-over of the multimedia controller initiates and controls the playback and selection of a multimedia item on an integrated multimedia player. The method also includes enabling a user to simultaneously navigate the social network portal and stream content via the integrated multimedia player. A user can also search for or request multimedia content via the multimedia controller and player.

16 Claims, 22 Drawing Sheets

(51) Int. Cl.
| | |
|---|---|
| *H04L 29/06* | (2006.01) |
| *H04L 29/08* | (2006.01) |
| *H04N 21/2743* | (2011.01) |
| *H04N 21/4782* | (2011.01) |
| *H04N 21/4788* | (2011.01) |
| *H04N 21/482* | (2011.01) |
| *G06Q 10/10* | (2012.01) |
| *G06Q 50/00* | (2012.01) |

(52) U.S. Cl.
CPC ......... *H04L 65/4084* (2013.01); *H04L 67/02* (2013.01); *H04N 21/2743* (2013.01); *H04N 21/4782* (2013.01); *H04N 21/4788* (2013.01); *H04N 21/4828* (2013.01)

(56) References Cited

U.S. PATENT DOCUMENTS

| | | | |
|---|---|---|---|
| 7,783,767 B2* | 8/2010 | Collazo ........................ | 709/229 |
| 2007/0043766 A1* | 2/2007 | Nicholas et al. .......... | 707/104.1 |
| 2007/0169165 A1 | 7/2007 | Crull et al. | |
| 2007/0255785 A1 | 11/2007 | Hayashi et al. | |
| 2008/0133767 A1* | 6/2008 | Birrer et al. ................. | 709/231 |
| 2008/0155109 A1* | 6/2008 | Khedouri et al. ............ | 709/229 |
| 2008/0222199 A1 | 9/2008 | Tiu et al. | |
| 2008/0242280 A1* | 10/2008 | Shapiro et al. ............ | 455/414.3 |
| 2009/0043783 A1* | 2/2009 | Wakasa et al. ................. | 707/10 |
| 2009/0061841 A1* | 3/2009 | Chaudhri et al. ............ | 455/420 |
| 2009/0150797 A1* | 6/2009 | Burkholder et al. ......... | 715/747 |
| 2009/0199275 A1* | 8/2009 | Brock et al. ...................... | 726/4 |
| 2009/0265426 A1* | 10/2009 | Svendsen et al. ............ | 709/204 |
| 2009/0271309 A1* | 10/2009 | Gordon et al. ................. | 705/37 |
| 2010/0031162 A1* | 2/2010 | Wiser et al. ................. | 715/747 |
| 2010/0211565 A1 | 8/2010 | Lotito | |
| 2010/0318571 A1* | 12/2010 | Pearlman et al. ............ | 707/784 |
| 2010/0332565 A1* | 12/2010 | Al-Shaykh et al. .......... | 707/912 |
| 2011/0137902 A1 | 6/2011 | Wable et al. | |

OTHER PUBLICATIONS

"Balancing the Power of Multimedia Information Retrieval and Usability in Designing Interactive TV" Proceeding UXTV '08 Proceeding of the 1st International Conference on Designing Interactive User Experiences for TV and Video, Oct. 22, 2008, pp. 105-114.

Search Report for PCT/US2012/063105, mailed on Aug. 11, 2015, 6 pages.

* cited by examiner

INTEGRATED SOCIAL NETWORK AND STREAM PLAYBACK

CROSS-REFERENCE TO RELATED APPLICATION

This application claims the benefit under 35 U.S.C. §119(e) of U.S. patent application Ser. No. 61/554,452, entitled "Integrated Social Network and Stream Playback" filed Nov. 1, 2011, the entire contents of which are incorporated herein by reference.

BACKGROUND

Social networks are becoming an increasingly popular way for people to stay connected and share content. This increasing popularity of social networks has given rise to many social network services that have developed various ways users of the social network can communicate and share information. Users within a social network can send each other messages, monitor other users' activities on a daily basis and share personal information, including personal photographs and videos. Social networking services have provided a great forum for users to remain in close contact despite geographic distance or uncoordinated schedules. Further, the development of other online services that enable the general sharing of information has also increased. The ability for users to share information with others, and view information about others is available in many different venues.

SUMMARY

Implementations herein overcome the deficiencies and limitations of the prior art by providing a system and method for integrating audio and/or video playback within a social network portal of a user. The description herein relates to social networks. In particular, implementations relate to playing and sharing multimedia content within a social network. Still more particularly, the implementations relate to integrating social networks and playback of multimedia content.

According to one innovative aspect of the subject matter described in this disclosure, a social network portal of a user is hosted. On the portal, the user can view a social network associated with the social network portal via the social network portal. The social network portal displays information related to an account for the user on the social network. A multimedia controller is integrated on the social network portal of the user. A selection of the multimedia controller controls an integrated multimedia player. The multimedia controller includes a search field. A search query is received on the search field from a user of at least one client device. At least one term of the search query is compared to a list of predefined terms. Results are generated responsive to determining that the at least one term of the search query matches a term in the list. The generated search results includes two or more multimedia items associated with the search results. The search results and at least one of the two or more multimedia items are sent for display within a social network stream of the user.

In general, another innovative aspect of the subject matter described in this disclosure may be embodied in methods that include hosting a social network portal of a user. The user can view a social network associated with the social network portal via the social network portal. The methods may also include displaying information related to an account for the user on the social network and integrating a multimedia player on the social network portal of the user. A selection of the multimedia controller controls an integrated multimedia player. The methods may also include enabling a user to simultaneously navigate the social network portal and stream content via the integrated multimedia player.

Other aspects include corresponding methods, systems, apparatus and computer program products. These and other implementations may each optionally include one or more of the following features. The two or more multimedia items may include audio content. At least one of the two or more multimedia items may include video content. The methods, system and apparatus and computer program products may also include the steps of receiving a request from a user device via the multimedia controller; processing the request, wherein the request includes at least one term associated with multimedia content; generating at least one result based on the request, wherein the at least one result includes associated multimedia content; and sending the generated result, including the associated multimedia content for display on the social network portal of the user. The methods, system and apparatus and computer program products may also include generating, in a separate browser window, the integrated multimedia player. The launch of the integrated multimedia player may be initiated upon selection of an area of the social network portal of the user. The methods, system and apparatus and computer program products may also include enabling sharing, on the social network portal of the user, multimedia content played on the integrated multimedia player.

Described herein is a computer-implemented method for processing search queries within a social network performed on one or more computing devices. The method includes receiving, on the one or more computing devices, a search query from a user of at least one client device. The search query is inputted via a social network portal of the user of the client device. At least one term of the search query is then compared to a list of predefined terms. Responsive to determining that the at least one term of the search query matches a term in the list, search results are generated. The generated search result includes a multimedia item associated with the search results. In some implementations, the search results and associated multimedia item are sent for display within a social network stream of the user. In some implementations, the search results and associated multimedia item are sent for display to the user via a new browser window or tab. In some implementations, the multimedia item includes audio content. In some implementations, the multimedia item includes video content.

A computer-implemented method for providing a social network portal with an integrated multimedia player performed on one or more computing devices includes hosting, on the one or more computing devices, a social network portal of a user, wherein the social network portal displays information of the user. The method further includes integrating, on the social network portal of the user, a multimedia controller. In some implementation, the multimedia controller is part of the social network portal. In other implementations, multimedia controller may be available in a separate browser window or tab. A selection of the multimedia controller initiates and controls the playback of a multimedia item on an integrated multimedia player. The method also includes enabling a user to simultaneously navigate the social network portal and stream content via the integrated multimedia player.

In some implementations, the method further includes receiving a request from a user device via the multimedia controller. The request is processed. The request includes at least one term associated with multimedia content. At least one result is generated based on the request. The at least one result includes associated multimedia content. The generated result including the associated multimedia content is sent for display on the social network portal of the user.

According to one implementation, a computer-implemented method for providing a social network portal with an integrated multimedia player performed on one or more computing devices includes hosting, on the one or more computing devices, a social network portal of a user. The social network portal displays information of the user. The method further includes generating, in a separate browser window, an integrated multimedia player. The launch of the integrated multimedia player is initiated upon selection of an area of the social network portal of the user. The method also includes enabling a user to simultaneously navigate the social network portal and stream content via the integrated multimedia player.

In some implementations, the above method further includes receiving, on the one or more computing devices, via the integrated multimedia player a request. The request is processed. The request includes at least one term associated with multimedia content. At least one result is generated based on the request. The result includes associated multimedia content. The generated result, including the associated multimedia content is sent for display on the social network portal of the user.

A computer-implemented method for sharing at least one multimedia item within a social network portal of a user, performed on one or more computing devices includes hosting, on the one or more computing devices, a social network portal of a user. The social network portal displays information of the user. The method also includes generating, in a separate browser window, an integrated multimedia player. The launch of the integrated multimedia player is initiated upon selection of an area of the social network portal of the user. Sharing multimedia content played on the integrated multimedia player is enabled on the social network portal of the user. The sharing is initiated upon selection of an area of the integrated multimedia player.

BRIEF DESCRIPTION OF THE DRAWINGS

The implementations are illustrated by way of example, and not by way of limitation in the figures of the accompanying drawings in which like reference numerals are used to refer to similar elements.

DETAILED DESCRIPTION

Figure 1A:
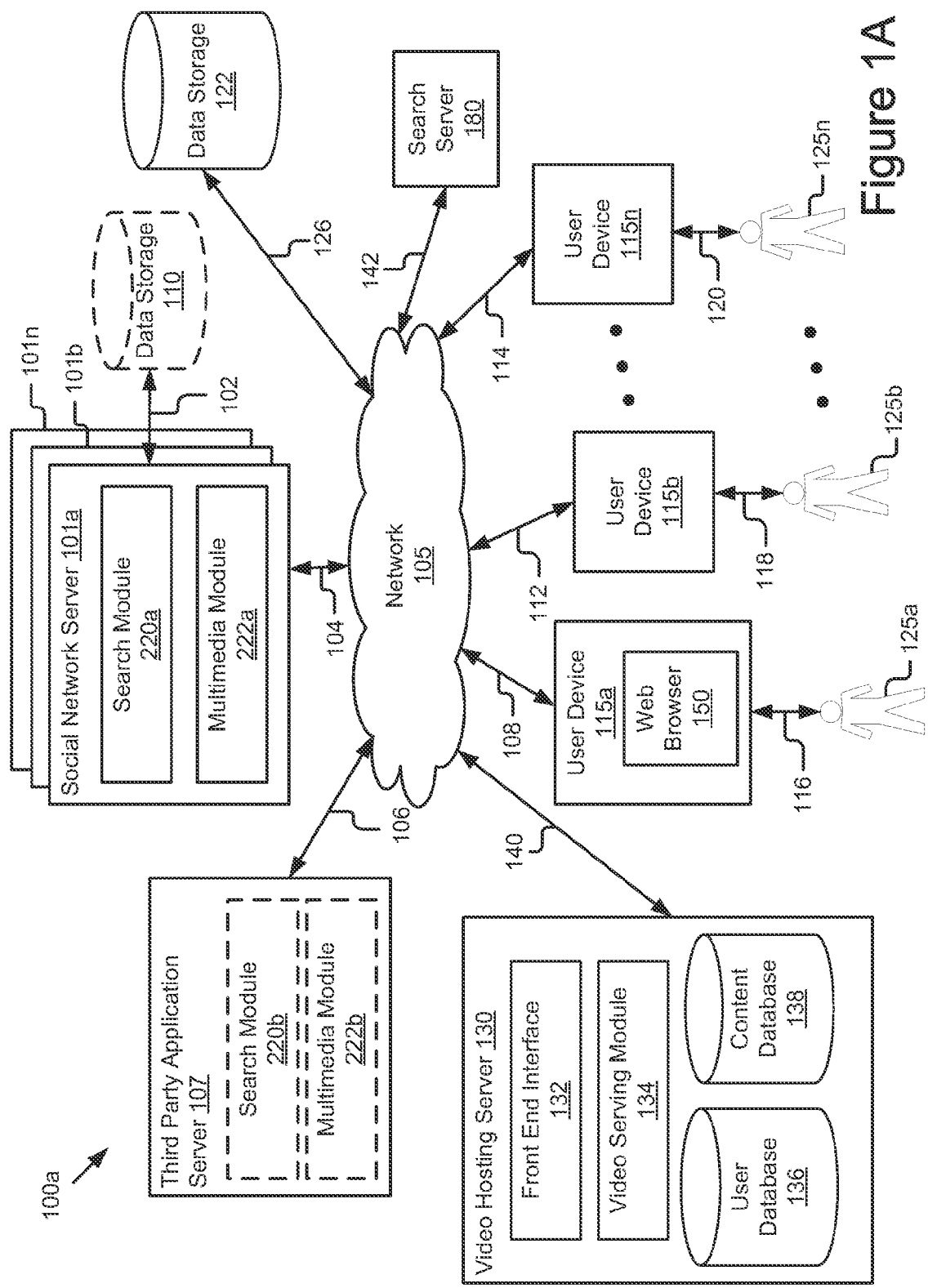
FIGS. 1A and 1B are example high-level block diagrams illustrating a social network system 100a according to some implementations.

A system and method for integrating multimedia search and playback into a social network portal is described. The term 'social network portal' as used herein includes its plain and ordinary meaning, including, but not limited to, a user's view into a social network, as controlled by the user's setting, preferences, security settings, and access controls. According to some implementations, a user can search for multimedia content, such as video content, available on a content provider via the user's social network portal. The user enters a search query describing an artist or musician into a search query field included in the social network portal, and multimedia content available via a content provider is searched. If multimedia content is found, the search results appear in the content stream of the social network portal of the user. In some implementations, these results are only viewable by the user. The user then has the option of sharing the multimedia content and displaying it on the social network portal of the user.

In other implementations, a multimedia controller is included in the social network portal of a user. The user can search for, control, and play multimedia content, such as video content, via the multimedia controller. In some implementations, content may be recommended to the user. To illustrate, a user's social network portal includes a selectable icon representing the multimedia controller. When the user mouses-over or selects the icon, the multimedia controller is activated. With the controller, the user can search for multimedia content available from a content provider. If content is found, the multimedia controller can initiate a multimedia player that opens as a separate portal. The user can simultaneously control the player to stream multimedia content while navigating the social network portal without interruption to the user's social network experience.

In the following description, for purposes of explanation, numerous specific details are set forth in order to provide a thorough understanding of various implementations. It will be apparent, however, to one skilled in the art that the implementations can be practiced without these specific details. In other instances, structures and devices are shown in block diagram form in order to avoid obscuring aspects of implementations. For example, one implementation is described below with reference to user interfaces and particular hardware. However, implementations may be implemented on any type of computing device that can receive data and commands, and any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Furthermore, some implementations take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disc-read only memory (CD-ROM), compact disc-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present implementations are not described with reference to any particular programming language. It will be appreciated that a variety of programming languages may be used to implement the teachings of the implementations as described herein.

FIG. 1A illustrates a block diagram of a social network system 100a integrating multimedia search and playback in a social network portal according to one implementation. The illustrated social network system 100a includes user devices 115a, 115b, and 115n (also referred to collectively as user devices 115 or individually as user device 115) that are accessed by users 125a, 125b, and 125n (also referred to collectively as users 125 or individually as user 125), a social network server 101a, a search server 180, a third party application server 107, data storage 122, and a video hosting server 130. In the illustrated implementation, these entities are communicatively coupled via a network 105. Although only three user devices 115a/115b/115n are illustrated, any number of user devices 115a/115b/115n are available to any number of users 125a/125b/125n.

The illustrated implementation of a social network system 100a includes user devices 115a, 115b, 115n that are accessed by users 125a, 125b, 125n a social network server 101a that is coupled to data storage 110, and a third party application server 107. In the illustrated implementation, these entities are communicatively coupled via a network 105. The user devices 115a, 115b, 115n in FIG. 1A are used by way of example. While FIG. 1A illustrates three devices, implementations herein apply to any system architecture having one or more user devices. Furthermore, while only one network 105 is coupled to the user devices, 115a, 115b, 115n, the social network server, and the third party application server 107, in practice any number of networks 105 can be connected to, or may connect, the entities.

Although only one social network server 101a is shown, it will be recognized that multiple servers may be present. A social network is any type of social structure where the users are connected by a common feature. Examples include, but are not limited to, blogs, microblogs and Internet forums. The common feature includes friendship, family, a common interest, etc.

Figure 2:
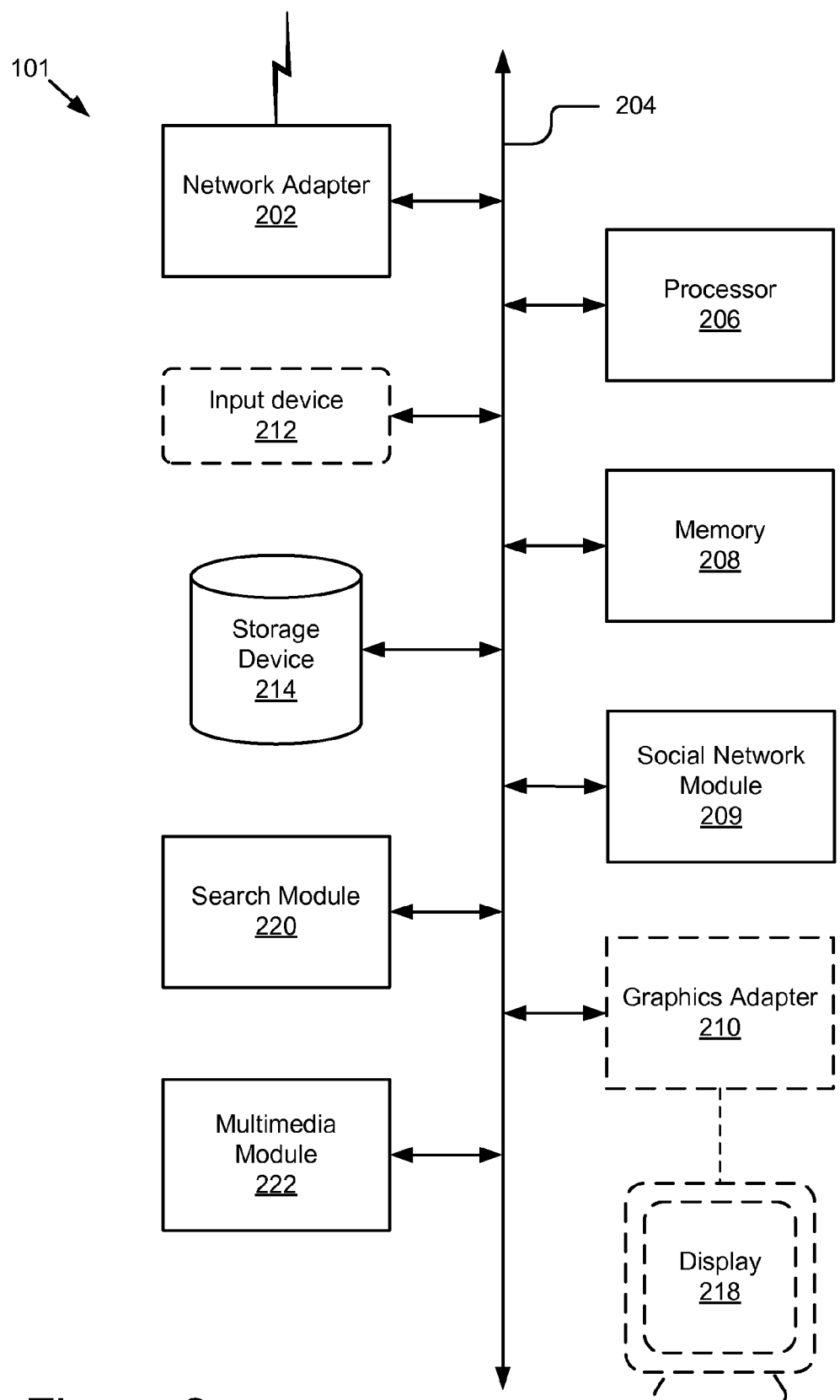
FIG. 2 is a block diagram of a social network server in accordance with some implementations.

In one implementation, the social network server 101a is coupled to the network 105 via signal line 104. The social network server 101a also includes a social network module 209 (as shown in FIG. 2). Although only one social network server 101a is shown, persons of ordinary skill in the art will recognize that multiple servers may be present. A social network is any type of social structure where the users are connected by a common feature, for example, Orkut. The common feature includes relationships/connections, e.g., friendship, family, work, an interest, etc. The common features are provided by one or more social networking systems, such as those included in the system 100a, including explicitly-defined relationships and relationships implied by social connections with other online users, where the relationships form a social graph. In some examples, a social graph can reflect a mapping of these users and how they are related. Furthermore, it should be understood that social network server 101a and social network software/application 209 (as shown in FIG. 2) are representative of one social network and that there are multiple social networks 101b . . . 101n coupled to the network 105, each having its own server, application and social graph. For example, a first social network may be more directed to business networking, a second more directed to or centered on academics, a third is more directed to local business, a fourth directed to dating and others of general interest or a specific focus.

In one implementation, a search module 220a and multimedia module 222a are included in the social network server 101a and are operable on the social network server 101, which is connected to the network 105 via signal line 104. In another implementation, the search module is included in the search server 180 and is operable on the search server 180, which is connected to the network 105 via signal line 142. In another implementation, the search module 220b and multimedia module 222b are included in the third party application server 107 and are operable on the third party application server 107, which is connected to the network 105 via signal line 106. It will be recognized that the search module 220a/220b (referred to generally as the search module 220) can be stored in any combination on the servers. In some implementations the search module 220 includes multiple, distributed modules that cooperate with each other to perform the functions described below. Details describing the functionality and components of search module 220 are explained in further detail below with regard to FIG. 3. Similarly, it will also be recognized that the multimedia module 222a/222b (referred to generally as the multimedia module 222) can be stored in any combination on the servers. In some implementations the multimedia module 222 includes multiple, distributed modules that cooperate with each other to perform the functions described below. Details describing the functionality and components of interactive multimedia module 222 are explained in further detail below with regard to FIG. 4.

The network 105 enables communications between user devices 115a, 115b, the social network server 101a and the third party application server 107. Thus, the network 105 can include links using technologies such as Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs) or Internet Protocol security (IPsec). In another implementation, the entities can use custom and/or dedicated data communications technologies instead of, or in addition to, the ones described above. Depending upon the implementation, the network 105 can also include links to other networks.

In one implementation, the network 105 is a partially public or a wholly public network such as the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wireline or wireless (i.e., terrestrial—or satellite-based transceivers). In one implementation, the network 105 is an IP-based wide or metropolitan area network.

In the illustrated implementation, the video hosting server 130 is communicatively coupled to the network 105 via signal line 140. The video hosting server 130 is a system allowing users to access video content via searching and/or browsing interfaces. An example of a video hosting server 130 is the YOUTUBE™ website, found at www.youtube.com. Other video hosting sites are known as well, and can be adapted to operate according to the disclosure herein. It will be understood that the term "website" represents any computer system adapted to serve content using any Internet working protocol, and is not intended to be limited to content uploaded or downloaded via the Internet or the HTTP protocol.

In one implementation, the video hosting server 130 receives video data, or other content, via uploads of videos by users of user devices 115 or uploads from a content provider (not shown). Alternatively, the video hosting server 130 searches, or crawls, other web sites, databases of videos, or other sources for content, such as video data. In another implementation, the video hosting server 130 receives content from a combination of uploads and searching for content. For example, a video hosting server 130 receives content from one or more user devices 115 responsive to the user device 115 receiving a user request to upload content to the video hosting server 130. As another example, the video hosting server 130 receives content by crawling user devices 115 and/or crawling a content provider (not shown) and/or additional sources to obtain content, allowing real-time acquisition of content. In some implementations, the users 125 associated with user devices 115 may have to opt into having their devices 115 searched or crawled. In other implementations, they may be opted in by default and have the option of opting out of having their devices 115 searched or crawled.

In one implementation, the video hosting server 130 is configured to receive and distribute various types of content, such as video data, audio data, image data, textual data or other types of data. The content received and/or distributed by the video hosting server 130 may be represented using any suitable media type and/or file type. For example, the video hosting server 130 shares content such as a video, audio, combination of video and audio, image such as a JPEG or GIF file, and/or a text file.

The video hosting server 130 is communicatively coupled to the network 105. In the implementation shown by FIG. 1, the video hosting server 130 includes: a front end interface 132, a video serving module 134, a user database 136 and a content database 138. In other implementations, the video hosting server 130 may also include a video search module, an upload server, a presentation module, a thumbnail generator, a comment module and a comment database (not shown). The components of the video hosting server 130 are communicatively coupled to one another, such as via a bus. For clarity, conventional features of the video hosting server 130, such as firewalls, load balancers, authentication servers, application servers, failover servers, site management tools, and so forth are not shown in FIG. 1. In one implementation, the illustrated components of the video hosting server 130 are implemented as single pieces of software or hardware or as multiple pieces of software or hardware. In general, functions described in one implementation as being performed by one component, can also be performed by other components in other implementations, or by a combination of components. Furthermore, functions described in one implementation as being performed by components of the video hosting server 130 are performed by one or more user devices 115 in other implementations if appropriate. In one implementation, the functionality attributed to a particular component is performed by different or multiple components operating together.

In one implementation, the various servers and modules are implemented as a program executing on a computing device, such as a server-class computer, comprising a processor, a memory, a network interface, one or more peripheral interfaces and other well-known components. For example, a server-class computer is a computing device executing an open-source operating system such as LINUX, and that includes a high-performance processor, 1 G or more of memory, and 100 G or more of disk storage. In one implementation, other types of computers are used, and it is expected that as more powerful computers are developed in the future, they are configured in accordance with the teachings disclosed herein. In another implementation, the functionality implemented by any of the elements is provided from computer program products that are stored in tangible computer readable storage mediums (e.g., RAM, hard disk, or optical/magnetic media).

The front end interface 132 is an interface that handles communication with the content provider (not shown) and/or the user device 115 via the network 105. For example, the front end interface 132 receives video data uploaded from a content provider and delivers the video contents to the upload server. In one implementation, the front end interface 132 receives requests from users 125 of the user devices 115 and delivers the requests to the other components of the video hosting server 130 (e.g., a video search module or the video serving module 134). In some implementations, the front end interface 132 also receives requests from the social network server 101. For example, the front end interface 132 receives a video search query from a user 125 and sends the video search query to the video search module. As another example, the front-end interface 102 receives a comment from a user device 115 and communicates the comments to a comment module (not shown).

The content database 138 is a storage system that stores content shared by the video hosting server 130 with one or more user devices 115. In one implementation, the content database 138 stores content processed by an upload server. In another implementation, the content database 138 also stores metadata associated with content. For example, the content database 138 stores one or more of a title, a description, tag information, a duration of the content and/or other suitable data associated with the content. In one implementation, some or all of the metadata associated with the content is provided by a content provider.

The video serving module 134 is software and routines that, when executed by a processor (not pictured), process requests for videos, or other content, and provide videos to user devices 115. For example, the video serving module 134 receives a query from a user via the front end interface 132 and the user device 115 and retrieves a set of videos from the content database 138 based on the query. In some implementations, the video serving module 134 receives a requests from the social network server via the front end interface 132 and the video serving module 134 and retrieves a set of videos from the content database 138 based on the request.

In one implementation, the video serving module 134 receives a request from a user to access a video when the user clicks on a link to the video presented by a user device 115. The request received from the user includes a video ID of the video to be viewed. In one implementation, the video ID is included automatically in the request once the user clicks on the link for the video. The video serving module 134 uses the video ID to search and locate the video in the content database 138. Once the requested video is located, the video serving module 134 transmits the video to the front end interface 132. The video is presented to the user on a web page. In one implementation, metadata associated with the video is also presented with the video, such as the title and description of the video. In one implementation, after transmitting the video to the user, the video serving module 134 stores the video ID of the video in the user database 136 with the data of the respective user.

The user database 136 is a storage system that stores data and/or information associated with a user. For example, the user database 136 stores the video IDs of video contents uploaded by a user to the video hosting server 130 and the video IDs of video contents that the user has accessed from the content database 138 for viewing. In one implementation, the user is identified by using a login name and password and/or by using the user's internet protocol address. Additionally, the user database 136 may include data associated with the user, such as a user profile specifying preferences or attributes of the user. For example, the user database 136 includes a user profile specifying a location associated with a user, interests associated with the user, privacy settings associated with the user and/or other demographic information associated with the user.

In the illustrated implementation, the user device 115a is coupled to the network 105 via signal line 108. The user 125a can interact with the user device 115a as illustrated with line 116. Similarly, the user device 115b is coupled to the network via signal line 112. The user 125b can interact with the user device 115b as illustrated with line 118. The third party application server 107 is communicatively coupled to the network 105 via signal line 106. The social network server 101a is communicatively coupled to the network 105 via signal line 104. The social network server 101a is also communicatively coupled to data storage 110 via signal line 102.

Data storage 110 stores data and information of users 125 of the social network system 100a. Such stored information includes user profiles and other information identifying the users 125 of the social network system 100a. Examples of information identifying users include, but are not limited to, the user's name, contact information, gender, relationship status, likes, interests, links, education and employment history, location, political views, and religion. In one implementation, the information stored in data storage 110 also includes the user's list of current and past friends and the user's activities within the social network system 100a, such as anything the user posts within the social network system and any messages that the user sends to other users. In some implementations, the information stored in data storage 110 also includes data related to photos, videos, or other multimedia that the user has stored to the data storage 110 and also data related to multimedia the user has searched for or viewed. In some implementations, this multimedia may be videos retrieved from the video hosting server 130.

In some implementations, the social network system 100a includes a data storage 122, which is communicatively coupled to the network 105 via signal line 126. In some implementations, data and information of users 125 of the social network system 100a mentioned above are stored in data storage 122.

In one implementation, the user device 115a, 115b, 115n is an electronic computing device having a web browser 150 for interacting with the social network server 101a via the network 105 and is used by user 125a, 125b, 125n to access information in the social network system 100a. The user device 115a, 115b, 115n can be a computing device, for example, a laptop computer, a desktop computer, a tablet computer, a mobile telephone, a personal digital assistant (PDA), a mobile email device, a portable game player, a portable music player, a television with one or more processors embedded therein or coupled thereto, or any other electronic device capable of accessing a network.

Figure 1B:
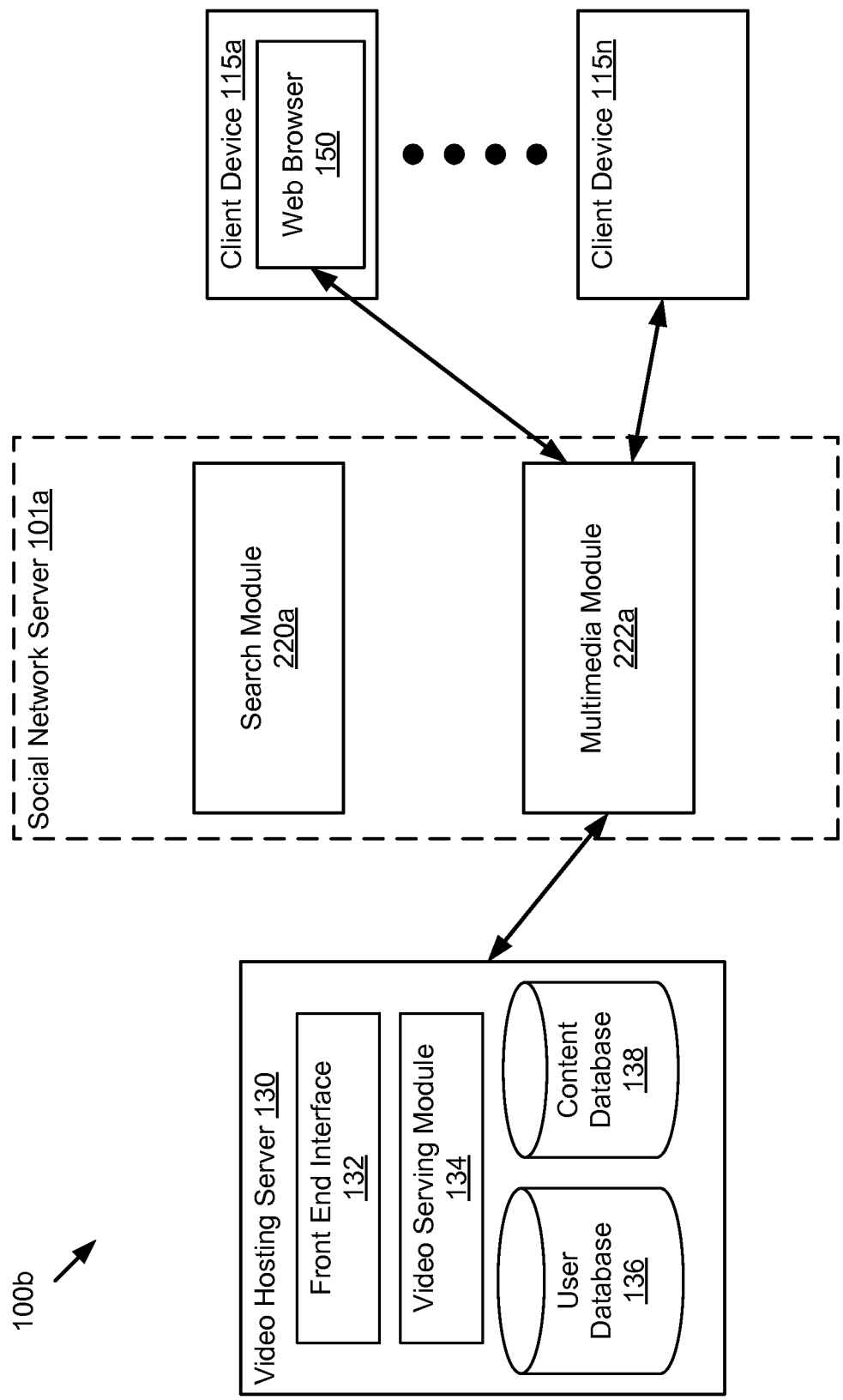

Now referring to FIG. 1B, another implementation for the social network system 100b is shown in more detail and will be described. In FIG. 1B, like reference numerals have been used to reference like components with the same or similar functionality that has been described above with reference to FIG. 1A. Further, since those components have been described above, that description will not be repeated here. As shown, the system 100b includes the video hosting server 130, social network server 101a and a plurality of user devices 115a-115n. In one implementation, each of the plurality of user devices 115a-115n includes the web browser 150 and is coupled for communication with the social network server 101a, and particularly, with the video hosting server 130. The video hosting server 130 and the web browsers 150 cooperate to generate and present multimedia players of social network portals that are synched across multiple open social network portals.

FIG. 2 is a block diagram of an implementation of a social network server 101. As illustrated in FIG. 2, the social network server 101 (for clarity and convenience, social network server 101a . . . 101n may be referred to individually or collectively herein as 101) includes a network adapter 202 coupled to a bus 204. Also coupled to the bus 204 are at least one processor 206, memory 208, a graphics adapter 210, an input device 212 (e.g., a keyboard and/or a pointing device), and a storage device 214. The social network server 101a also includes a search module 220 a multimedia module 222, and a social network module 209. In one implementation, the functionality of the bus 204 is provided by an interconnecting chipset. In some implementations, the social network server 101 also includes a display 218, which is coupled to the graphics adapter 210.

The processor 206 may be any general-purpose processor. The processor 206 comprises an arithmetic logic unit, a microprocessor, a general purpose controller or some other processor array to perform computations, and provide electronic display signals to display 218. The processor 206 is coupled to the bus 204 for communication with the other components of the social network server 101. Processor 206 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The social network server 101a also includes an operating system executable by the processor such as but not limited to WINDOWS®, MacOS X, Android, or UNIX® based operating systems.

The memory 208 holds instructions and data used by the processor 206. The instructions and/or data comprise code for performing any and/or all of the techniques described herein. The memory 208 may be a dynamic random access memory (DRAM) device, a static random access memory (SRAM) device, flash memory or some other memory device known in the art. In one implementation, the memory 208 also includes a non-volatile memory such as a hard disk drive or flash drive for storing log information on a more permanent basis. The memory 208 is coupled by the bus 204 for communication with the other components of the social network server 101.

The storage device 214 is any device capable of holding data, like a hard drive, compact disk read-only memory (CD-ROM), DVD, or a solid-state memory device. The storage device 214 is a non-volatile memory device or similar permanent storage device and media. The storage device 214 stores data and instructions for processor 206 and comprises one or more devices including a hard disk drive, a floppy disk drive, a CD-ROM device, a DVD-ROM device, a DVD-RAM device, a DVD-RW device, a flash memory device, or some other mass storage device known in the art.

The pointing device 216 may be a mouse, track ball, or other type of pointing device, and is used in combination with the keyboard 212 to input data into the social network server 101. The graphics adapter 210 displays images and other information on the display 218. The display 218 is a conventional type such as a liquid crystal display (LCD) or any other similarly equipped display device, screen, or monitor. The display 218 represents any device equipped to display electronic images and data as described herein. The network adapter 202 couples the social network server 101a to a local or wide area network.

The search module 220 is software and routines for receiving and processing search queries received by the social network server 101a from user devices 115. In some implementations, the search module 220 allows a user 125 to send a query to the social network server 101a and receive search results with associated multimedia items. In some implementations, the multimedia items may be video streams, and in other implementations, the multimedia items may be audio streams. Details describing the components and functionality of the search module 220 will be described in further detail below with regard to FIG. 3.

The multimedia module 222 is software and routines for generating a multimedia controller and player for controlling and playing multimedia within the social network system 100. In some implementations, the multimedia module 222 allows a user to access multimedia content from a video hosting server, control and play the multimedia content while simultaneously navigating the social network portal of the user. Details describing the components and functionality of the multimedia module 222 will be described in further detail below with regard to FIG. 4.

As is known in the art, the social network server 101a can have different and/or other components than those shown in FIG. 2. As is known in the art, the social network server 101a is adapted to execute computer program modules for providing functionality described herein. As used herein, the term "module" refers to computer program logic utilized to provide the specified functionality. Thus, a module can be implemented in hardware, firmware, and/or software. In one implementation, program modules are stored on the storage device 214, loaded into the memory 208, and executed by the processor 206.

Implementations of the entities described herein can include other and/or different modules than the ones described here. In addition, the functionality attributed to the modules can be performed by other or different modules in other implementations. Moreover, this description occasionally omits the term "module" for purposes of clarity and convenience.

Figure 3:
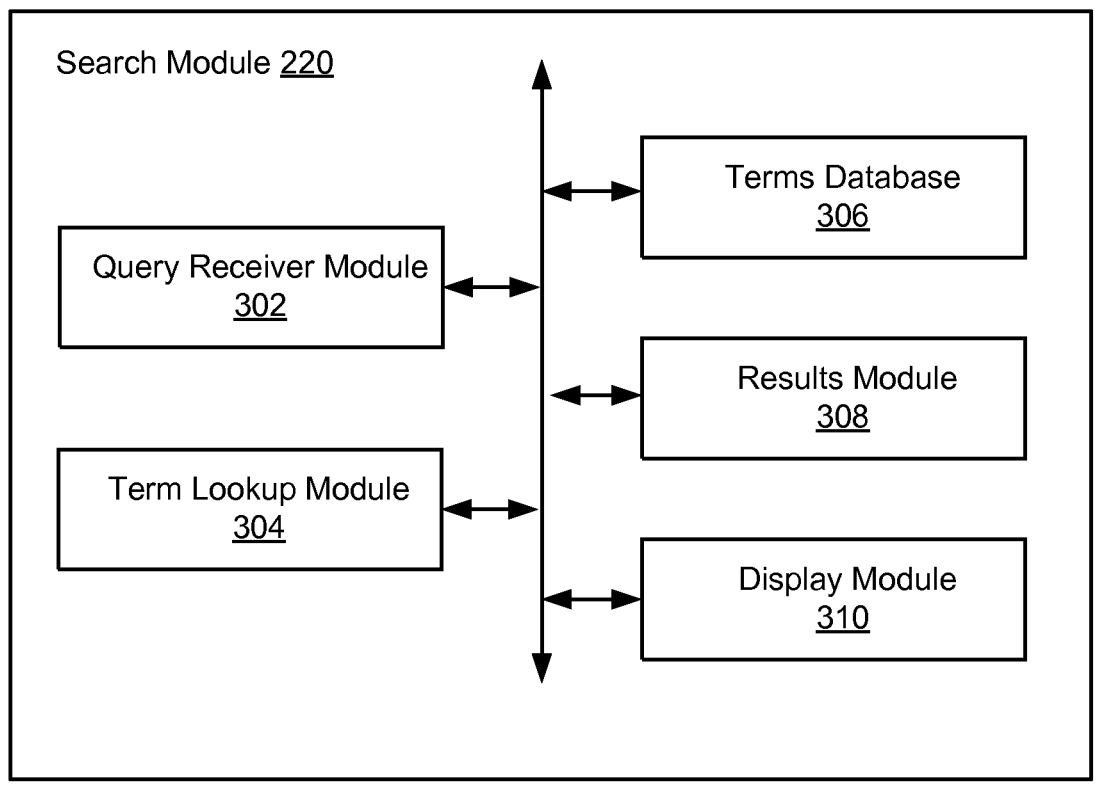
FIG. 3 is a block diagram illustrating modules within a search module of the social network server according to some implementations.

FIG. 3 is a block diagram illustrating modules within the search module 220 according to one implementation. As stated above, the search module 220 is software and routines executable by a processor to receive and process search queries received by the social network server 101a from user devices 115. The search module 220 includes a query receiver module 302, a term lookup module 304, a terms database 306, a results module 308, and a display module 310.

The query receiver module 302 of the search module 220 is software and routines for receiving search queries from user devices 115. In one implementation, the query receiver module 302 is a set of instructions executable by a processor to provide the functionality described below for receiving search queries from user devices 115. In another implementation, the query receiver module 302 is stored in the memory of the social network server 101a and is accessible and executable by a processor.

According to one implementation, the query receiver module 302 of the search module 220 receives queries sent from user devices 115 to the social network server 101a. The search query may include at least one term or a plurality of terms. In some implementations, the search query may include at least one term describing a username of a user of the social network system 100. In other implementations, the search query may include at least one term describing a musician or artist. The search query may include any term describing any subject of interest. Once the search query is received by the query receiver module 302, it is sent to the term lookup module 304.

The term lookup module 304 of the search module 220 is software and routines for determining whether a term in the received search query is included among a list of predefined terms. In one implementation, the term lookup module 304 is a set of instructions executable by a processor to provide the functionality described below for determining whether a term in the received search query is included among a list of predefined terms. In another implementation, the term lookup module 304 is stored in the memory of the social network server 101a and is accessible and executable by a processor.

According to one implementation, the term lookup module 304 of the search module 220 determines whether a term in the received search query is included among a list of predefined terms by comparing the received term or terms with a predefined list. According to some implementations, the terms database 306 stores the predefined terms of interest. In one implementation, the terms stored in the terms database 306 are terms describing musicians or artists that have associated videos stored in the content database 138 of the video hosting server 130.

The results module 308 of the search module 220 is software and routines for processing search results based on the received search query. In one implementation, the results module 308 is a set of instructions executable by a processor to provide the functionality described below for processing search results based on the received search query. In another implementation, the results module 308 is stored in the memory of the social network server 101a and is accessible and executable by a processor.

In some implementations, the terms database contains a predefined list of musicians, artists, or bands with associated music videos. In such implementations, if the at least one term of the search query matches a term in the list, a music video associated with the terms is searched for and the multimedia content of that music video is provided in response to the search query. If the search term is a musician, artist, or band, and there is a predefined list of songs associated with that musician, artist, or band, then that list of songs may be provided in response to the search query. In this way, the user requesting the search can be provided a playlist of videos in response to a query. Additionally, if there is not a predefined list of videos to provide to the user, then the system may generate a list of videos based on the popularity of songs for that musician, artist, or band, and return that list. The same may hold true for actors, directors, television shows, and any other entity or reference that may have videos or other media associated therewith. A search for that entity may be received and a list of media (such as movies by a searched-for director; highlight plays for an athlete; a mix of audio and video clips for a famous announcer; etc.) may be returned based on the search.

The display module 310 of the search module 220 is software and routines for sending the processed search results for display to a user device 115. In one implementation, the display module 310 is a set of instructions executable by a processor to provide the functionality described below for sending the processed search results for display to a user device 115. In another implementation, the display module 310 is stored in the memory of the social network server 101a and is accessible and executable by a processor.

Figure 4:
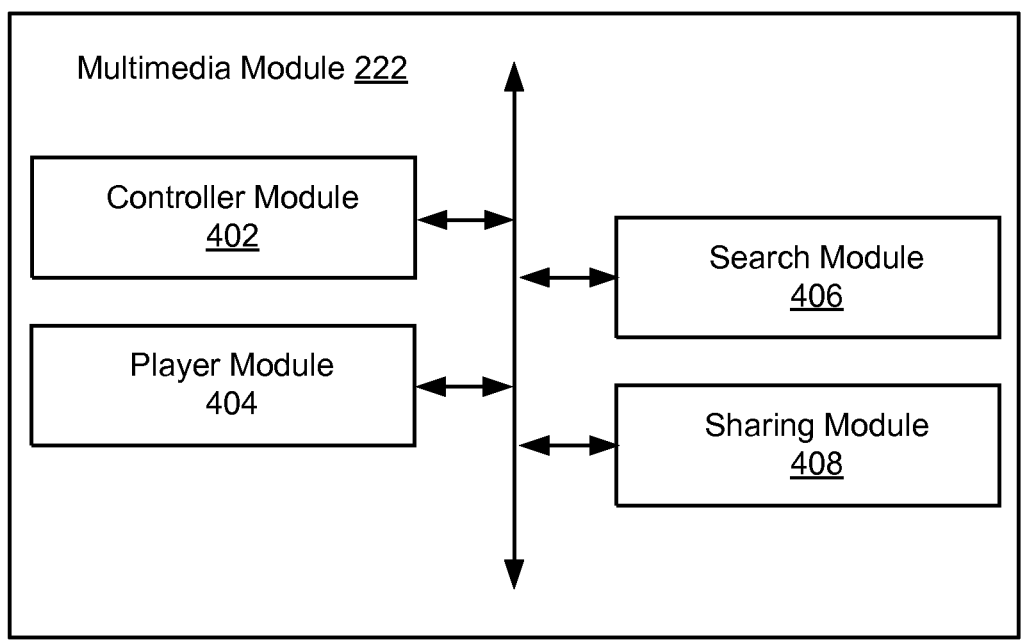
FIG. 4 is a block diagram illustrating modules within a multimedia module of the social network server according to some implementations.

FIG. 4 is a block diagram illustrating modules within the multimedia module 222 according to one implementation. As stated above, the multimedia module 222 is software and routines executable by a processor for generating a multimedia player and controller for playing multimedia within the social network system 100. The multimedia module 222 includes a controller module 402, a player module 404, a search module 406 and a sharing module 408.

The controller module 402 may include software and routines for generating a multimedia controller on a social network portal of a user. In one implementation, the controller module 402 is a set of instructions executable by a processor to provide the functionality described below for generating a multimedia controller on a social network portal of a user. In another implementation, the controller module 402 is stored in the memory of the social network server 101a and is accessible and executable by a processor.

The player module 404 may include software and routines for generating a multimedia player on a social network portal of a user. In one implementation, the player module 404 is a set of instructions executable by a processor to provide the functionality described below for generating a multimedia player on a social network portal of a user. In another implementation, the player module 404 is stored in the memory of the social network server 101a and is accessible and executable by a processor. In some implementations, the player module 404 generates the multimedia player as a separate window. Simultaneous navigation of the social network portal and streaming of content on the multimedia player is enabled by the player module 404.

The search module 406 may include software and routines for searching multimedia content provided by a content provider. In one implementation, the search module 406 is a set of instructions executable by a processor to provide the functionality described below for searching multimedia content provided by a content provider. In another implementation, the search module 406 is stored in the memory of the social network server 101a and is accessible and executable by a processor. The search module 406 allows a user to enter a search term via the multimedia controller or the multimedia player. The search module 406 receives the search term and searches a content database for multimedia items matching the search query.

The sharing module 408 may include software and routines for sharing multimedia content on a social network portal of a user. In one implementation, the sharing module 408 is a set of instructions executable by a processor to provide the functionality described below for sharing multimedia content on a social network portal of a user. In another implementation, the sharing module 408 is stored in the memory of the social network server 101a and is accessible and executable by a processor.

Figure 5:
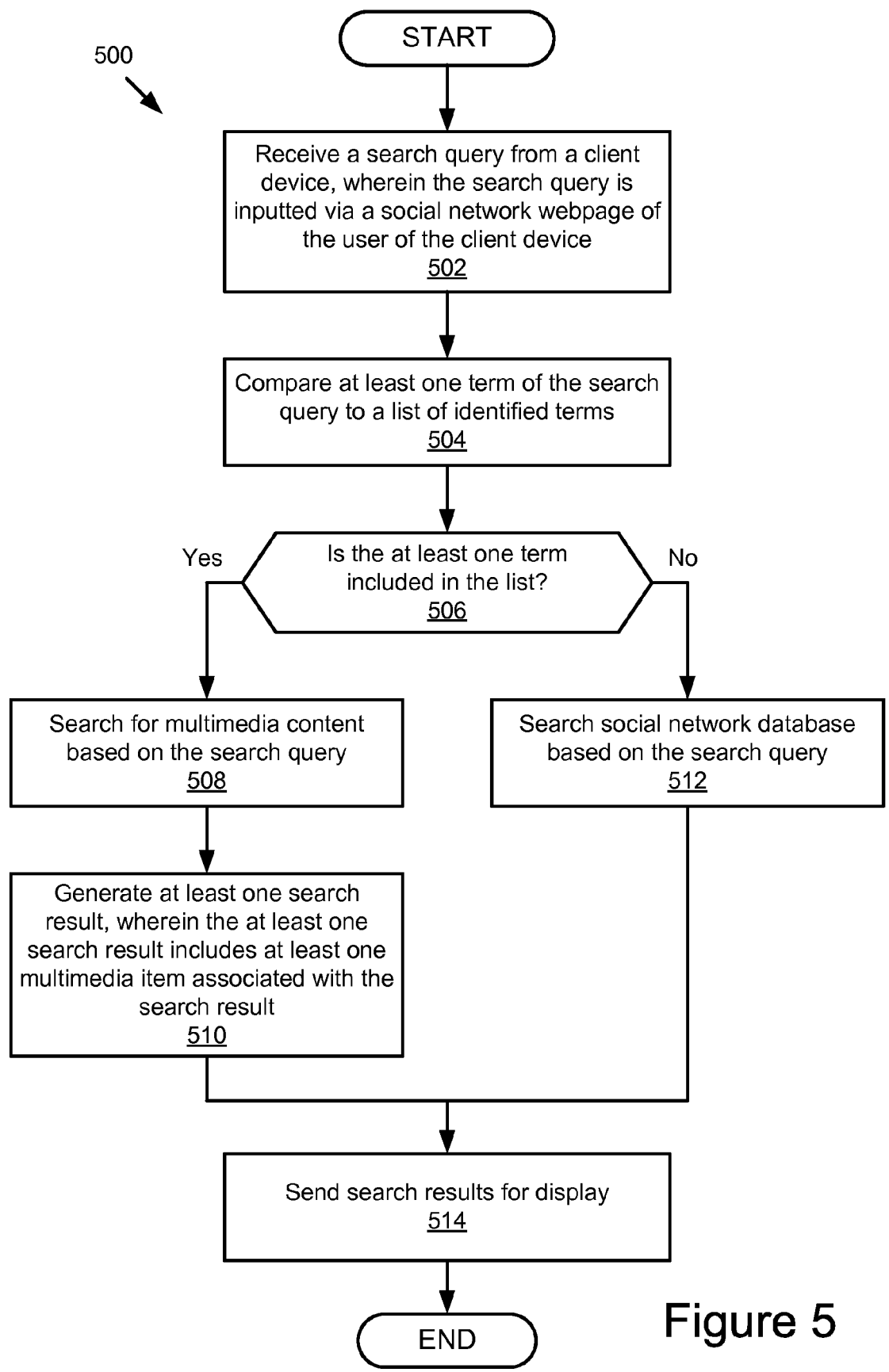
FIG. 5 is a flow diagram of a method for processing a search query in a social network system according to some implementations.

Referring now to FIGS. 5-8, various implementations of the processes will be described. FIG. 5 is a flow diagram of a method 500 for processing a search query in a social network system according to one implementation. A search query is received 502 by a query receiver module 302. At least one term of the search query is compared 504 to a list of predefined terms by the term lookup module 304 of the search module 220 of the social network server 101a. A terms database 306 stores the predefined terms. If the term is included in the list (506—Yes), multimedia content is searched 508 based on the search query. In some implementations, the content database 138 of the video hosting server 130 is searched. At least one search result is generated 510. The search result includes at least one multimedia item associated with the search result. As explained above, in some implementations, the terms database may contain a predefined list of musicians, artists, or bands (or other artists or entities) with associated music videos or other media. In such implementations, if the at least one term of the search query matches a term in the list, a music video associated with the terms is searched for and the multimedia content of that music video is provided in response to the search query. If the search term is a musician, artist, or band, and there is a predefined list of songs associated with that musician, artist, or band, then that list of songs may be provided in response to the search query. In this way, the user requesting the search can be provided a playlist of videos in response to a query. Additionally, if there is not a predefined list of videos to provide to the user, then the system may generate a list of videos based on the popularity of songs for that musician, artist, or band, and return that list.

In some implementation, the predefined list is not limited to including artists, musicians or bands. In such implementations, the predefined list may include names of or terms describing television shows, actors, directors, athletes, etc. In these implementations, the list generated may be a list of episodes or something similar.

The search results are sent 514 to the user device 115 for display. If the term is not included in the list (506—No), the social network database is search 512 and the search results are sent 514 to the user device 115 for display.

Figure 6:
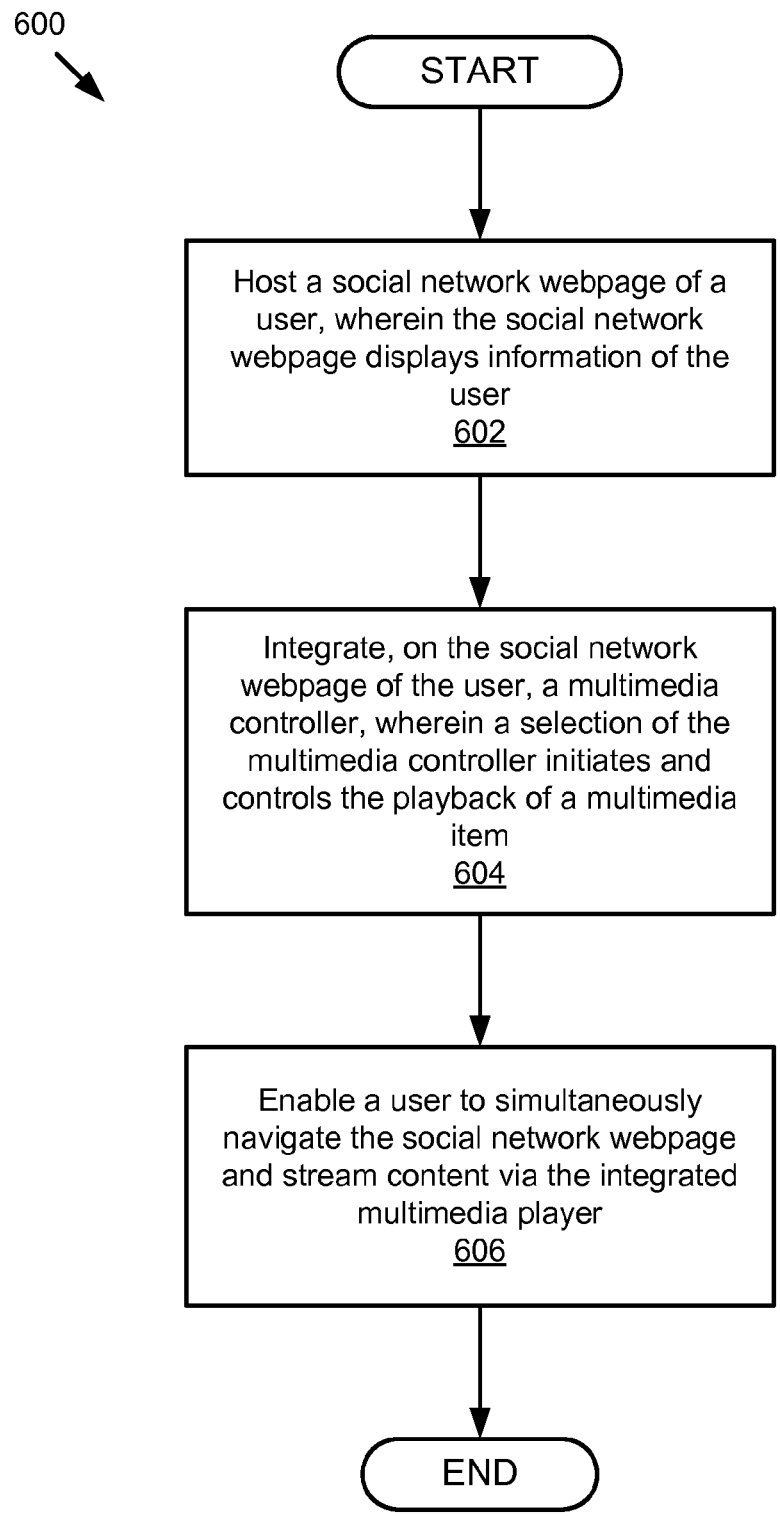
FIG. 6 is a flow diagram of a method for integrating a multimedia controller into a social network portal of a user according to some implementations.

FIG. 6 is a flow diagram of a method 600 for integrating a multimedia controller into to social network portal of a user according to one implementation of the present disclosure. A social network portal of a user is hosted 602 by a social network module 209. The social network portal contains information of the user. A multimedia controller is integrated on the social network portal by a controller module 402. In one implementation, selection or mouse-over of the multimedia controller initiates and controls a multimedia player. In some implementations, the selection or mouse-over of the multimedia controller controls the playback of multimedia items 604. In some implementations, selection or mouse-over of the multimedia controller allows for navigation of various multimedia content, editing of playlists, including adding or deleting multimedia content to playlists. A user is enabled 606 to simultaneously navigate the social network portal and stream content via the integrated multimedia player.

Figure 7:
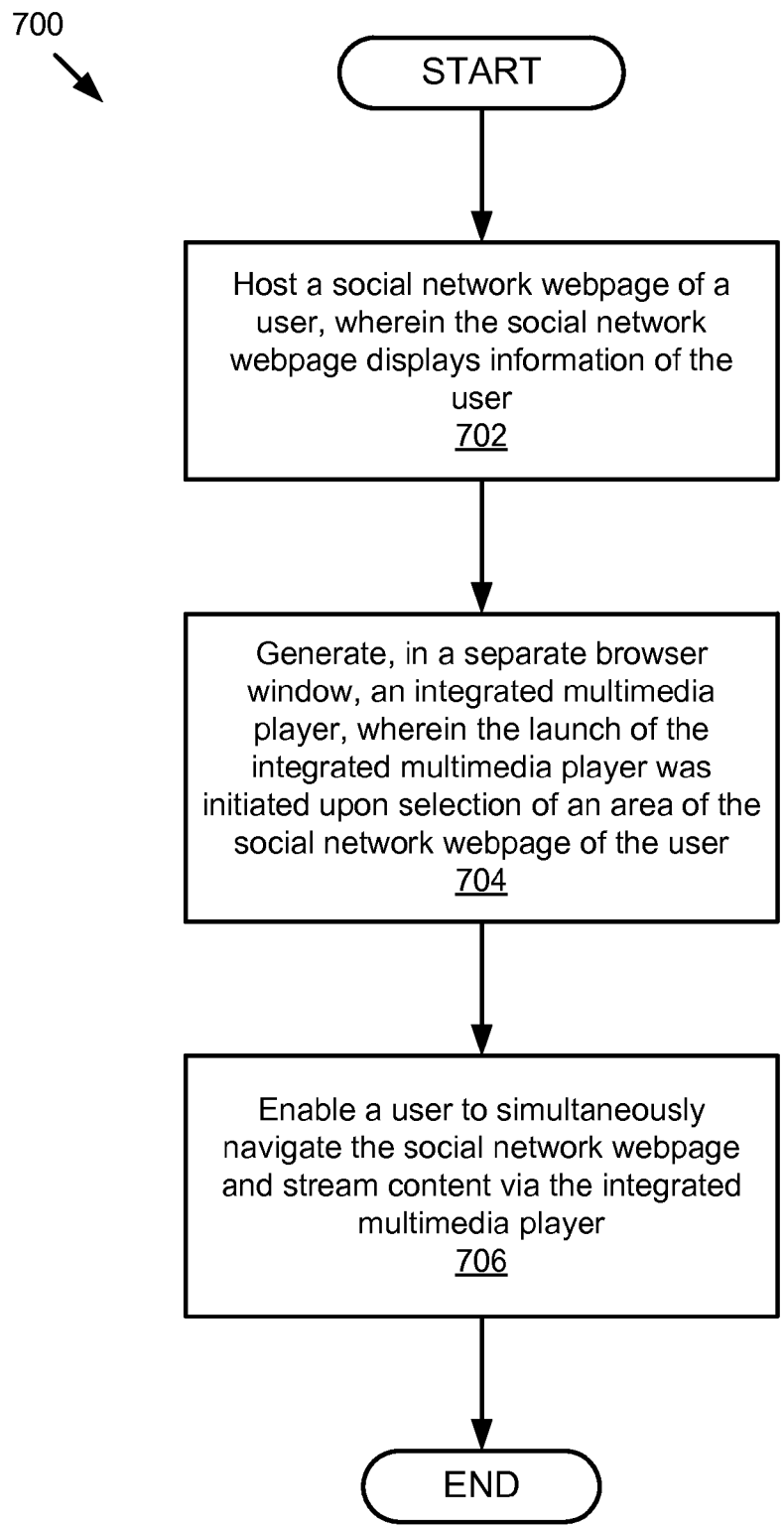
FIG. 7 is a flow diagram of a method for integrating a multimedia player into a social network portal of a user according to some implementations.

FIG. 7 is a flow diagram of a method 700 for integrating a multimedia player into to social network portal of a user according to one implementation of the present disclosure. A social network portal of a user is hosted 702 by a social network module 209. The social network portal contains information of the user. An integrated multimedia player is generated 704 by a player module 404 in a separate browser window. In some implementations, the launch of the integrated multimedia player is initiated upon selection of an area of the social network portal of the user. A user is enabled 706 to simultaneously navigate the social network portal and stream content via the integrated multimedia player.

In some implementations, the selection of a portion of the multimedia player controls the playback of multimedia items. In some implementations, selection of a portion of the multimedia player allows for navigation of various multimedia content, editing of playlists, including adding or deleting multimedia content to playlists.

Figure 8:
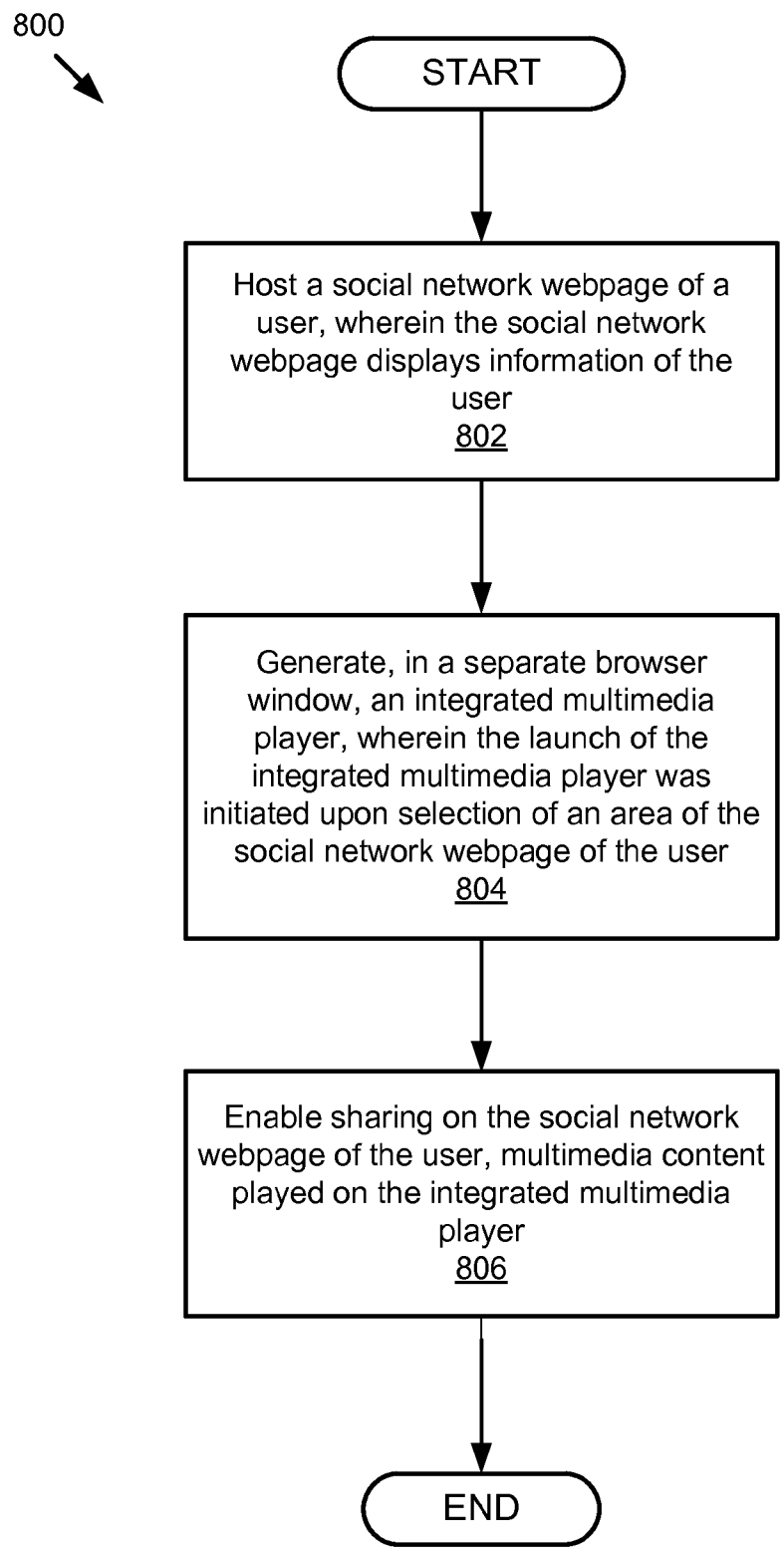
FIG. 8 is a flow diagram of a method for sharing multimedia content on a social network portal of a user according to some implementations.

FIG. 8 is a flow diagram of a method 800 for sharing multimedia content on a social network portal of a user according to one implementation of the present disclosure. A social network portal of a user is hosted 802 by a social network module 209. The social network portal contains information of the user. An integrated multimedia player is generated 804 by a player module 404 in a separate browser window. In some implementations, the launch of the integrated multimedia player is initiated upon selection of an area of the social network portal of the user. Sharing of the multimedia content played on the integrated multimedia player on the social network portal of the user is enabled 806 by a sharing module 408. In some implementations, the sharing is initialed upon selection of an area of the integrated multimedia player.

Figure 9:
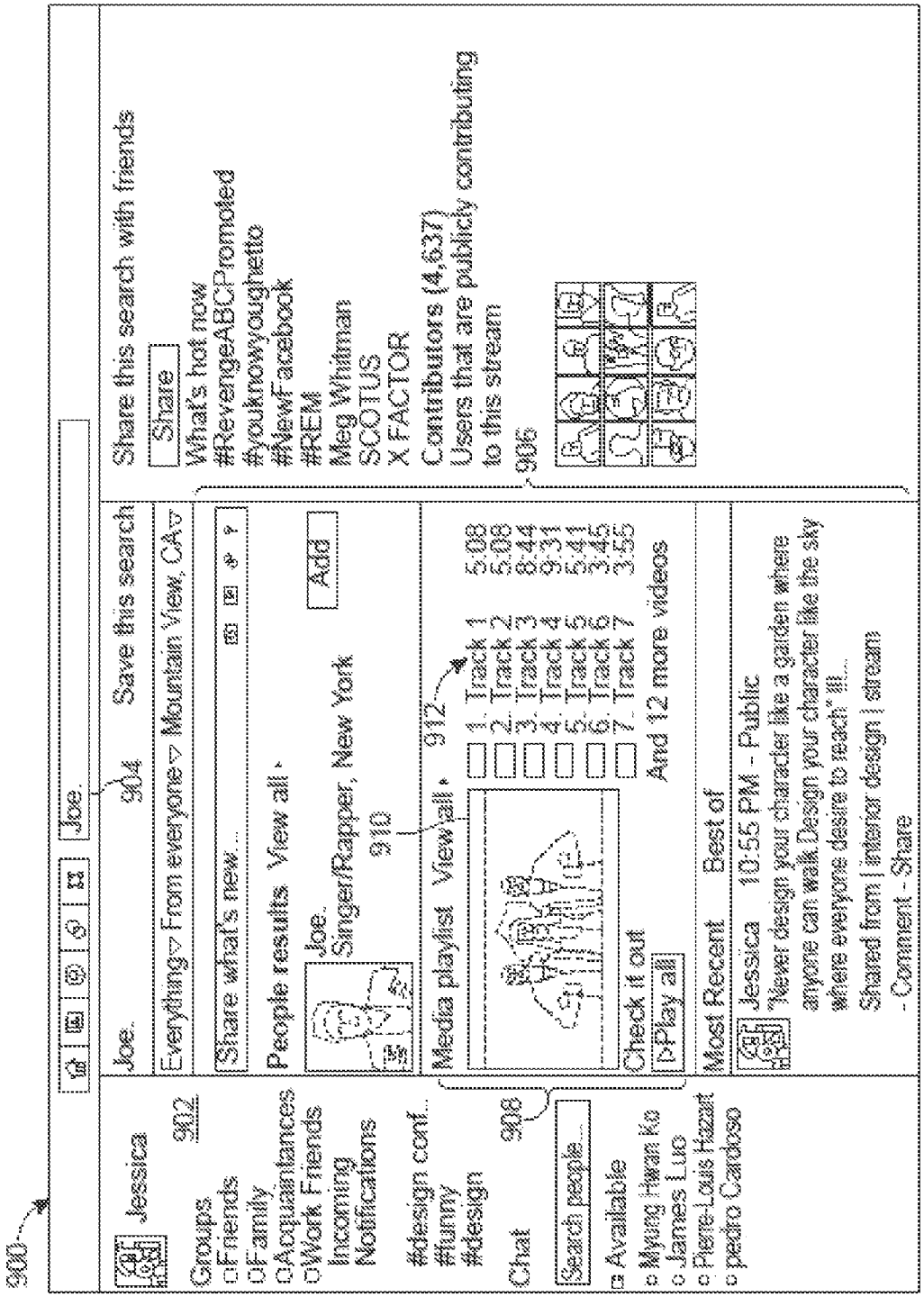
FIG. 9 is example of a graphical user interface of a social network portal with an integrated multimedia controller illustrating an input of a search query and generation of at least one search result according to some implementations.

FIG. 9 is example of a graphical user interface 900 of a social network portal 902 with an integrated multimedia controller illustrating an input of a search query and generation of at least one search result according to one implementation. The social network portal 902 includes a search query input field 904. A user may enter a search query into the search query input field 904 and the search query will be sent to the social network server 101a for processing. In this example illustrated in FIG. 9, a user has entered a search query "Joe." into the search query input field 904, which will be sent to the social network server 101a for processing. The social network portal 902 also includes a content stream 906 where various information is displayed on the social network portal 902 of the user. Within the content stream 906, a multimedia results list 908 is included. In some implementations, the list is generated in response to the server 101a find an artist or musician that matches the search query. In some implementations, the list includes at least one search result with associated multimedia content 910. The multimedia content 910 also includes an associated playlist 912 that lists other multimedia content associated with the search result.

Figure 10:
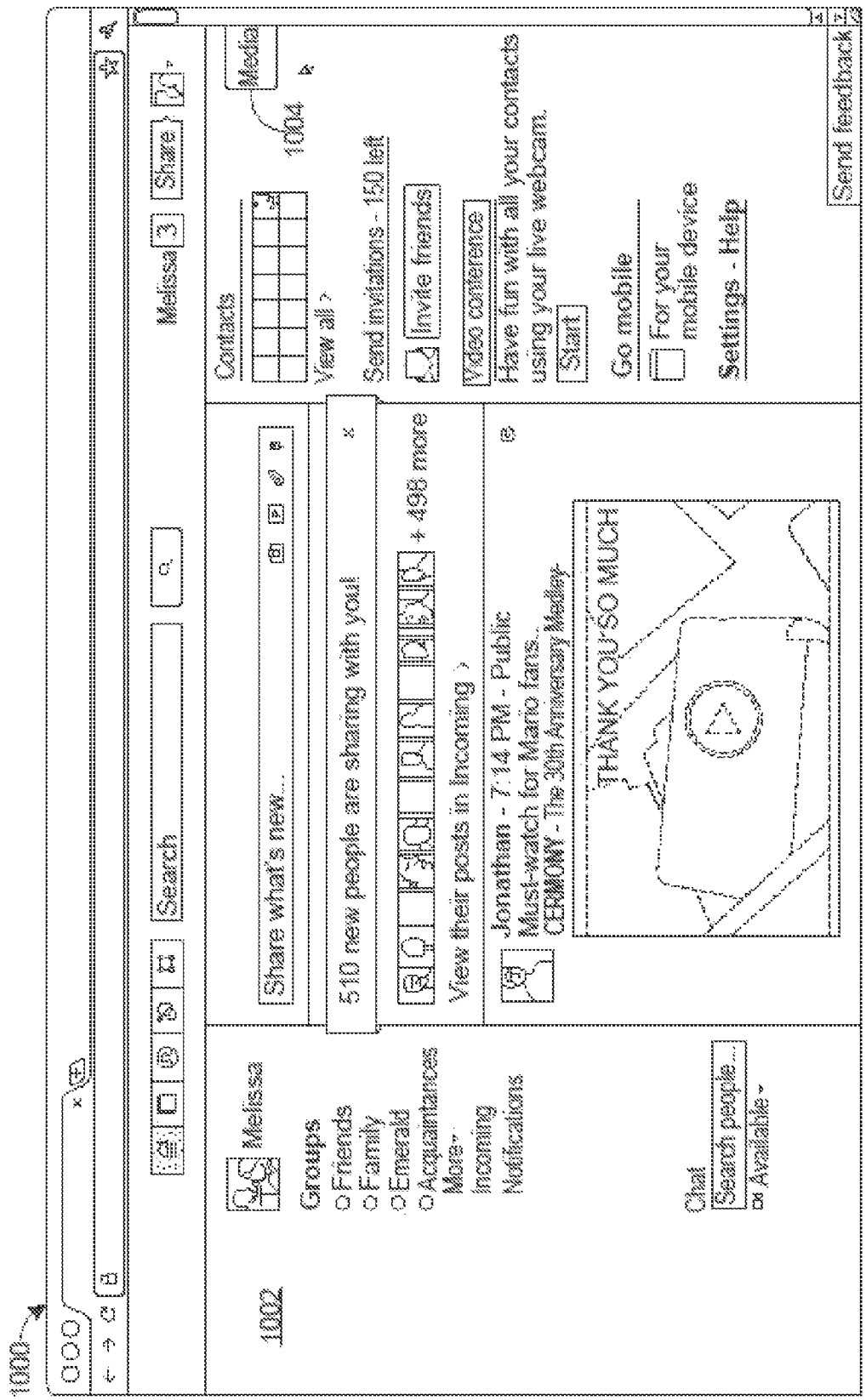
FIG. 10 is an example of a graphical user interface of a social network portal with an integrated multimedia controller according to some implementations.

FIG. 10 is an example of a graphical user interface 1000 of a social network portal 1002 with an integrated multimedia controller according to one implementation. In this example, the social network portal 1002 includes a multimedia controller 1004 for controlling and playing multimedia content in the social network portal 1002. In this example, the multimedia controller 1004 is a graphic representation. In other implementations, the multimedia controller 1004 may be any type of image or other graphic representation that is included in the social network portal 1002.

Figure 11:
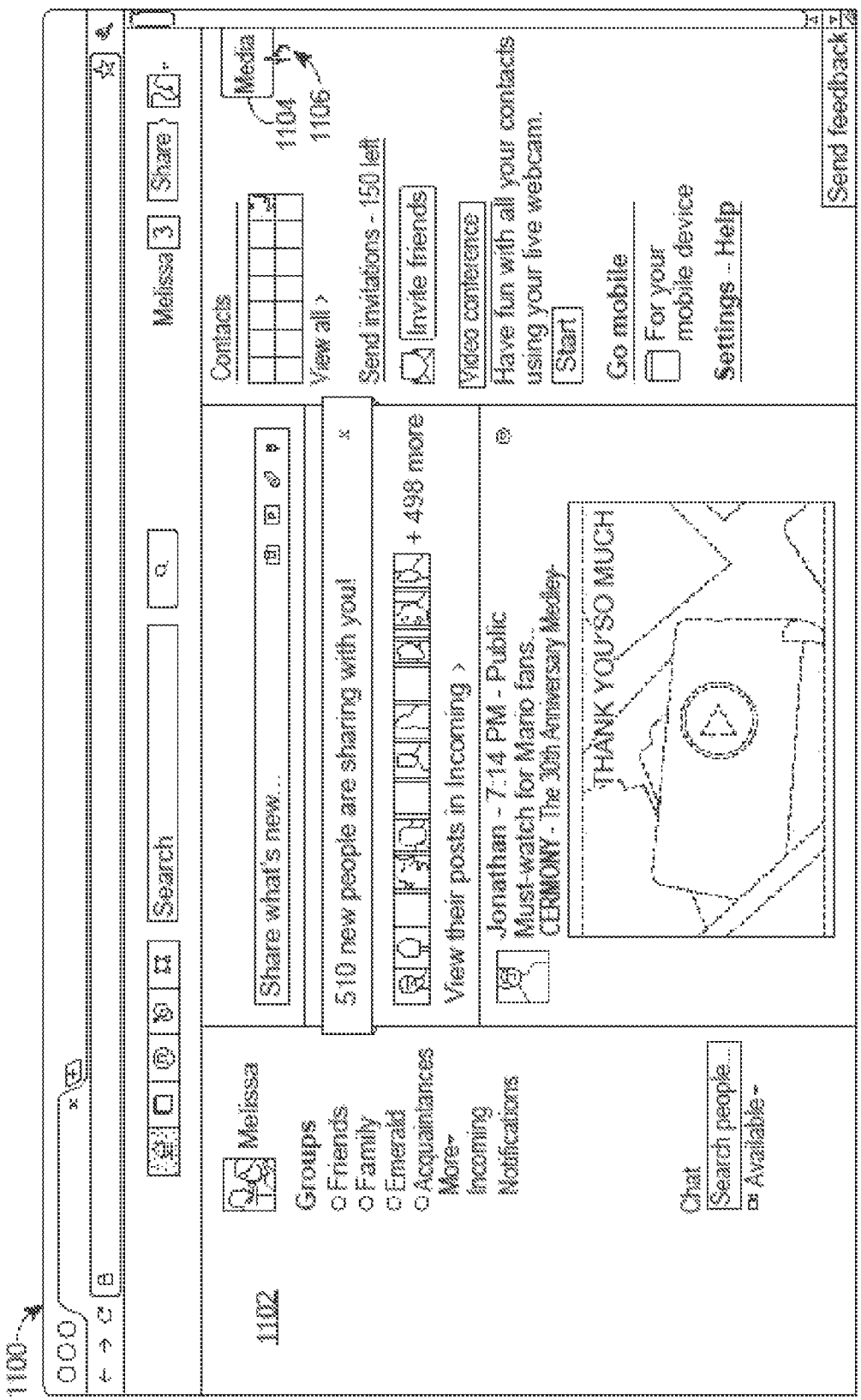
FIG. 11 is another example of a graphical user interface of a social network portal with an integrated multimedia controller according to some implementations.

FIG. 11 is another example of a graphical user interface 1100 of a social network portal 1102 with an integrated multimedia controller according to another implementation. In this example, the social network portal 1102 includes a multimedia controller 1104 for controlling and playing multimedia content in the social network portal 1002. This figure shows a mouse-over 1006 of the multimedia controller 1104.

Figure 12:
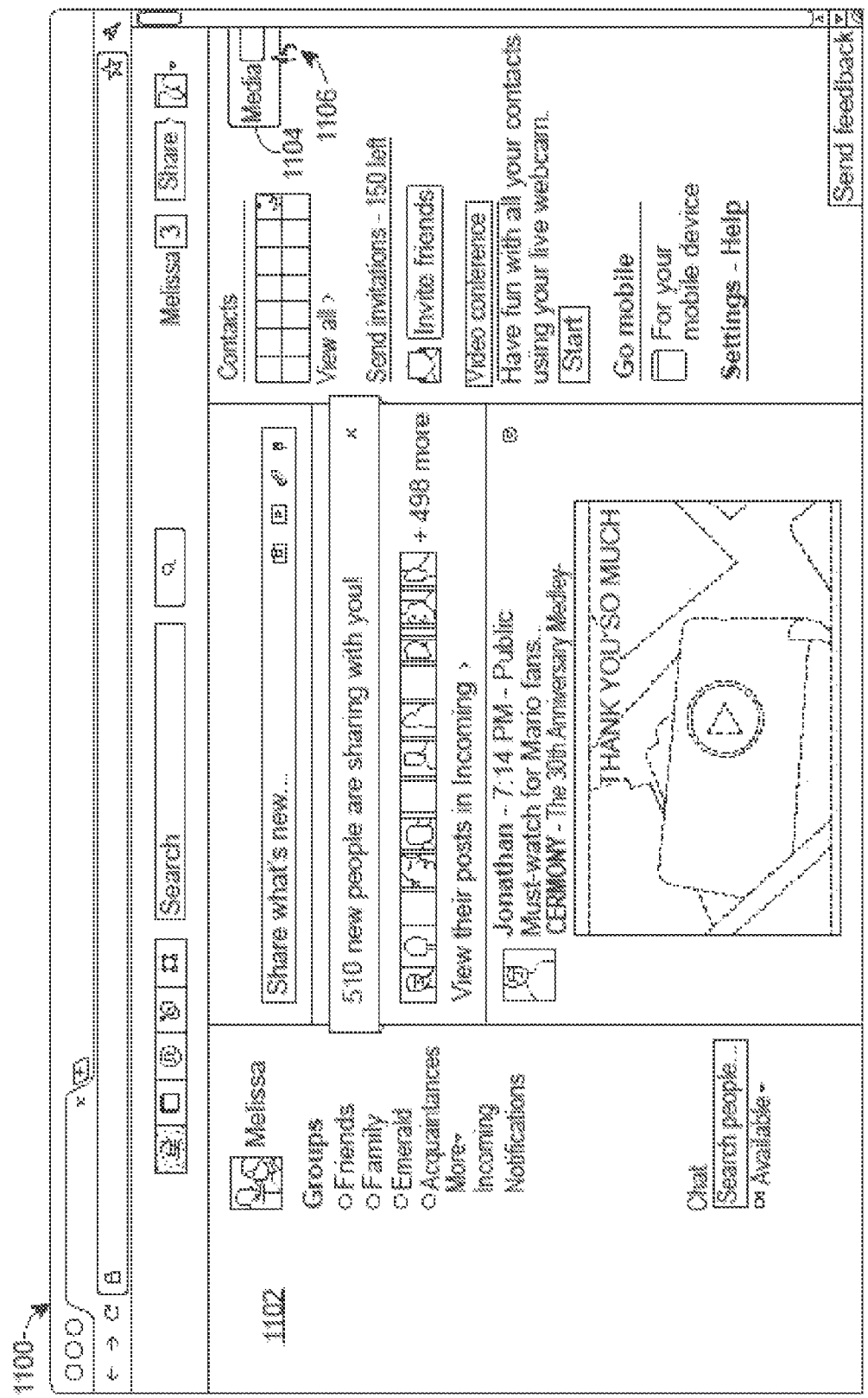
FIG. 12 is an example of a graphical user interface of a social network portal with an integrated multimedia controller illustrating activation of the multimedia controller according to some implementations.

FIG. 12 is an example of a graphical user interface 1100 of a social network portal 1102 with an integrated multimedia controller illustrating activation of the multimedia controller 1104 according to one implementation. FIG. 12 shows the result of the mouse-over 1106 shown in FIG. 11. When a user mouses-over the multimedia controller 1104, the multimedia controller 1104 is activated. In this example, and according to one implementation, upon mouse-over 1106 of the multimedia controller 1104, the multimedia controller 1104 is animated. Here, the figure is attempting to show the multimedia controller 1104 expanding out to include a search field and controller icon.

Figure 13:
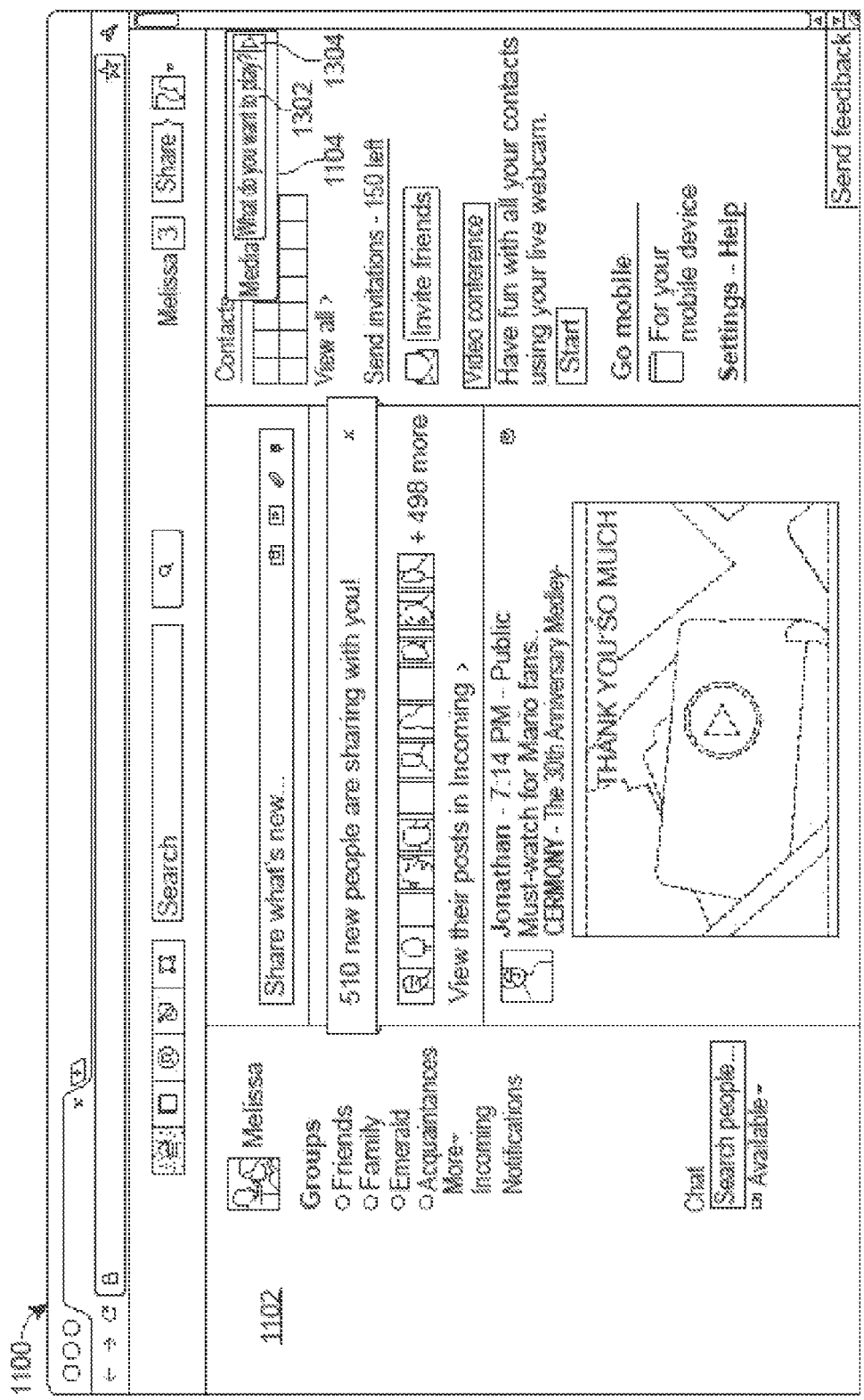
FIG. 13 is another example of a graphical user interface of a social network portal with an integrated multimedia controller according to some implementations.

FIG. 13 is another example of a graphical user interface 1100 of a social network portal 1102 with an integrated multimedia controller according to another implementation. In this example, the multimedia controller 1104 includes a search query input field 1302 and multimedia control icon 1304. A user can enter a search query into the search query input field 1302 to search for multimedia content to be played in the social network portal 1102 of the user.

Figure 14:
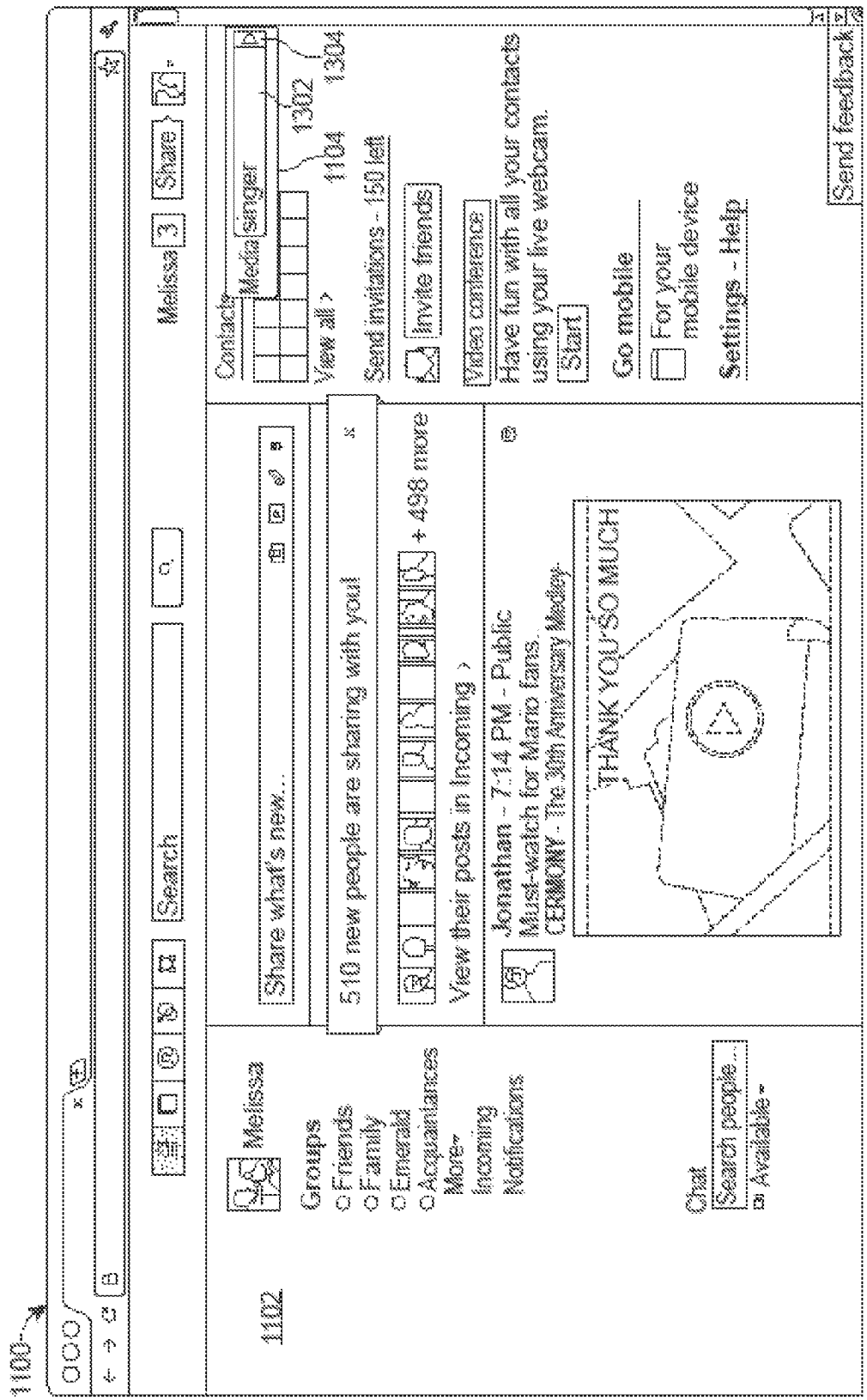
FIG. 14 is an example of a graphical user interface of a social network portal with an integrated multimedia controller illustrating inputting a request via the multimedia controller according to some implementations.

FIG. 14 is an example of a graphical user interface 1100 of a social network portal 1102 with an integrated multimedia controller illustrating inputting a request via the multimedia controller according to one implementation. In this example, the multimedia controller 1104 includes a search query input field 1302 and multimedia control icon 1304. Here, a user has entered the search query "singer" into the search query input field 1302.

Figure 15:
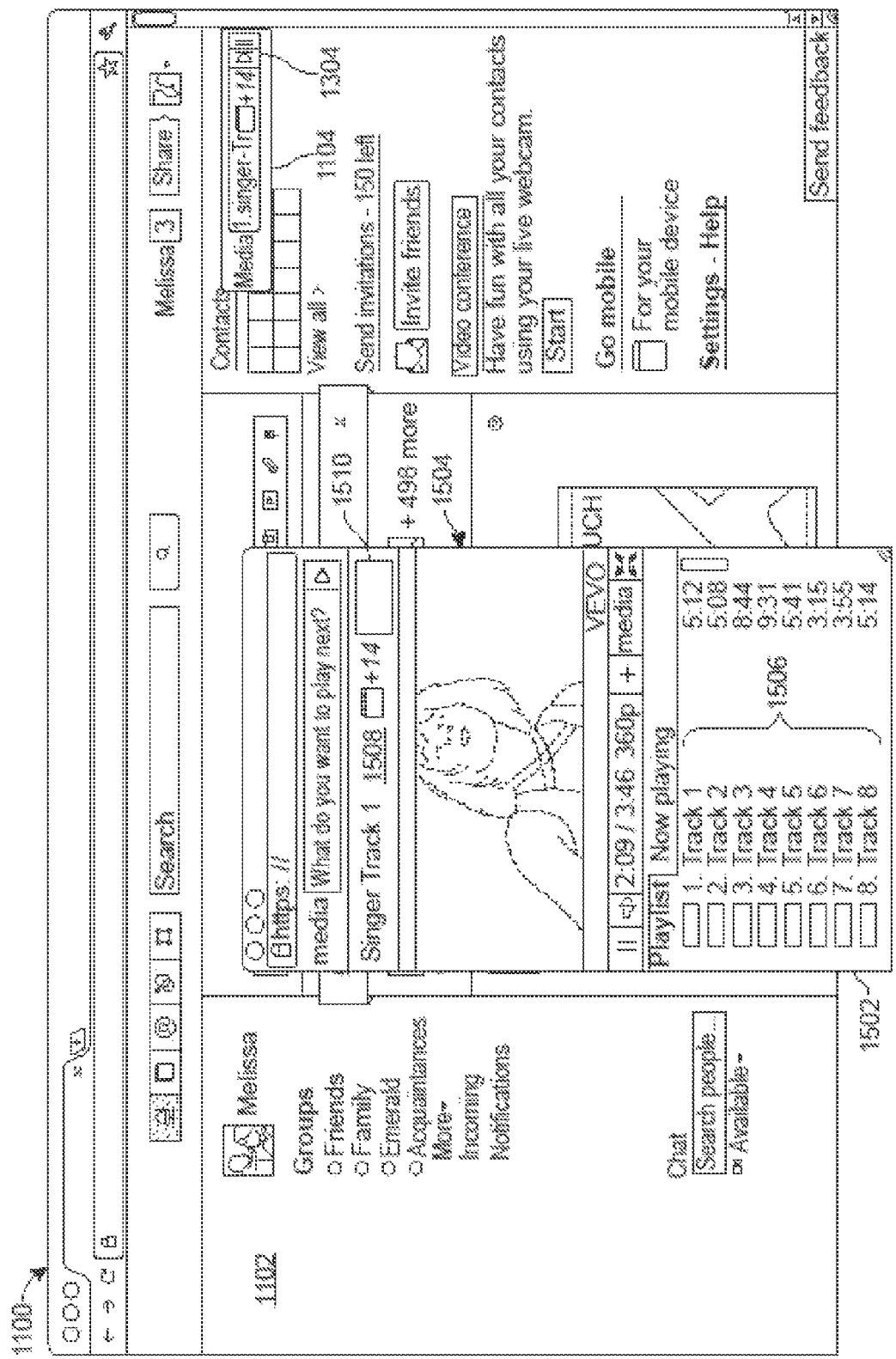
FIG. 15 is example of a graphical user interface of a social network portal with an integrated multimedia controller and an activated multimedia player according to some implementations.

FIG. 15 is example of a graphical user interface 1100 of a social network portal 1102 with an integrated multimedia controller and an activated multimedia player 1502 according to one implementation. When a user enters a search query into the search query input field 1302 (e.g., as shown in FIG. 14), a multimedia player 1502 is generated. The multimedia control icon 1304 of the multimedia controller 1104 is changed to include various options for controlling the multimedia player 1502. As illustrated in this figure, the multimedia player 1502 includes multimedia content 1504 and a playlist 1506 of associated multimedia content that matches the search query. In some implementations, the playlist may include videos or songs for artists, musicians or bands. In other implementations, the playlist may include top-rated songs for artists, musicians or bands. In yet other implementations, the playlist may include episodes of television shows, movies or shows by a director, highlight clips of an athlete, audio and video clips of an announcer, etc.

In this implementation illustrated in FIG. 15, the multimedia player 1502 is generated as a separate portal from the social network portal 1102. The multimedia player 1502 can continue to stream the multimedia content 1504 while the user continues to navigate the social network portal 1102 of the user. If multiple portals are open, the multimedia player 1502 content stream is synched across the open windows. The multimedia player 1502 also includes a search query input field 1508 and a share button 1510. The search query input field 1508 allows a user to enter additional search queries to find multimedia content. The share button 1510 allows the user to share the multimedia content 1504 on the social network portal 1102 of the user.

Figure 16:
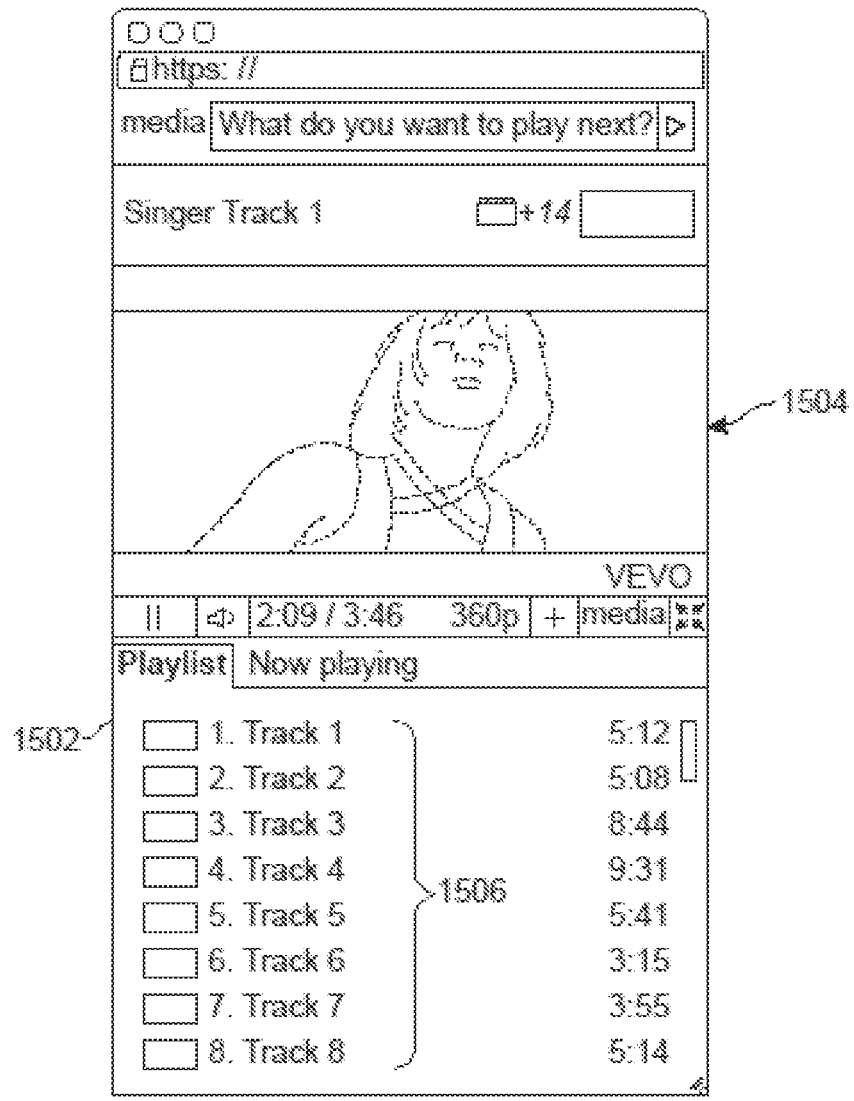
FIG. 16 is example of a graphical user interface of a multimedia player of a social network portal according to some implementations.

FIG. 16 is example of a graphical user interface of a multimedia player 1502 of a social network portal according to one implementation. Similar to the multimedia player 1502 shown in FIG. 15, the multimedia player 1502 of FIG. 16 also includes multimedia content 1504 and a playlist 1506 of associated multimedia content that matches the search query.

Figure 17:
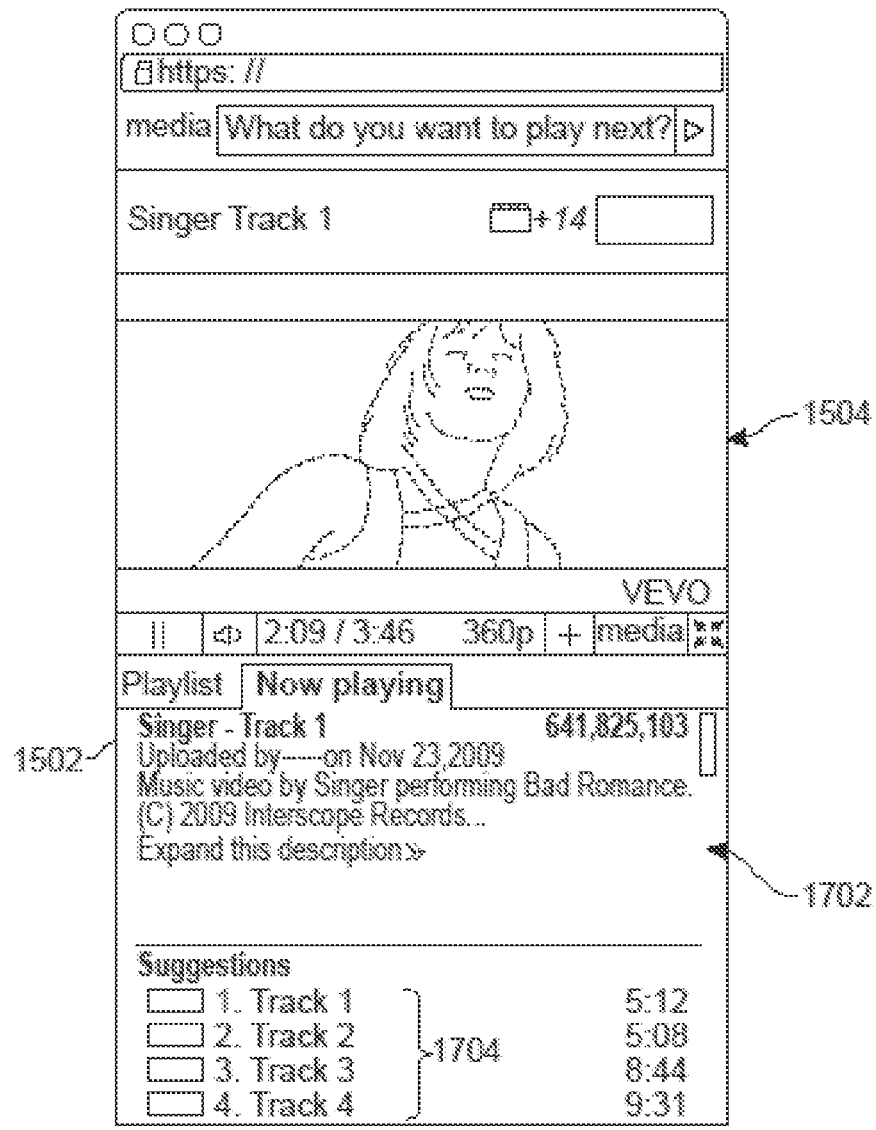
FIG. 17 is another example of a graphical user interface of a multimedia player of a social network portal according to some implementations.

FIG. 17 is another example of a graphical user interface of a multimedia player 1502 of a social network portal according to another implementation. Similar to the multimedia player 1502 shown in FIG. 15, the multimedia player 1502 of FIG. 16 also includes multimedia content 1504. In this example, the multimedia player 1502 displays metadata 1702 associated with the multimedia content 1504 streaming in the multimedia player 1502. The multimedia player 1502 also includes a list 1704 of suggested multimedia content.

Figure 18:
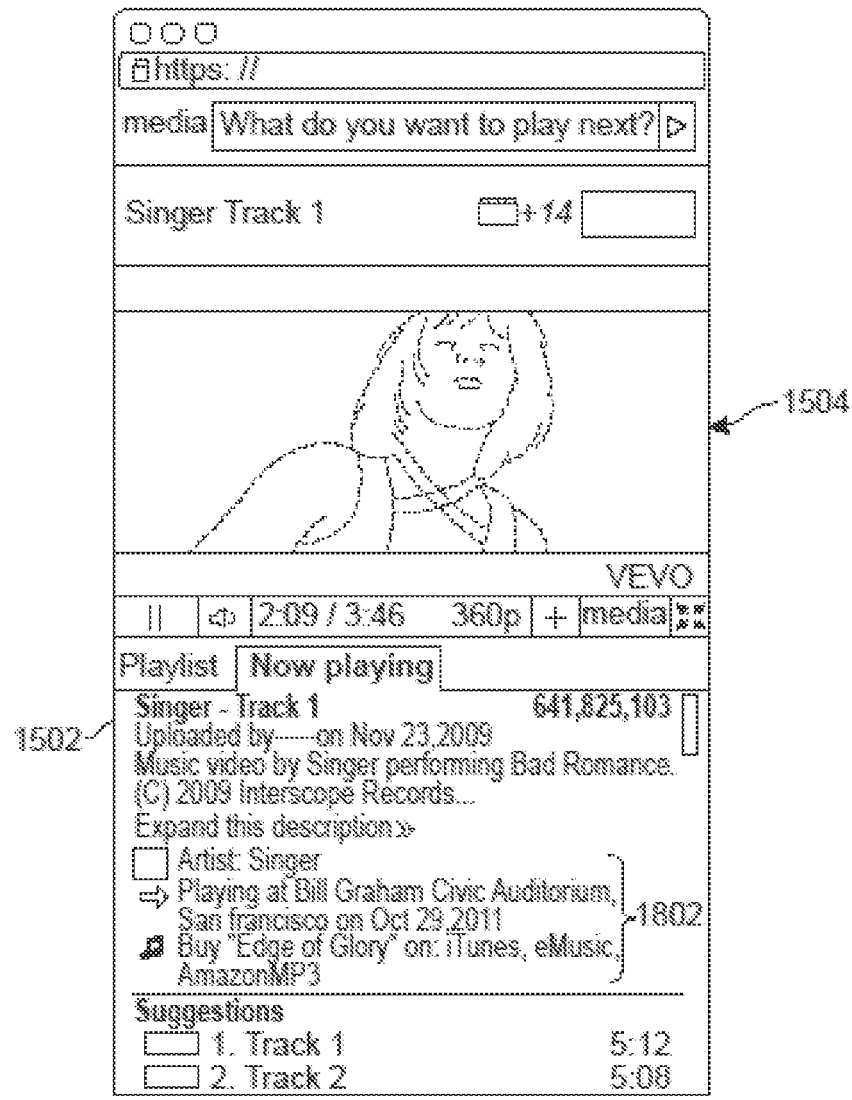
FIG. 18 is yet another example of a graphical user interface of a multimedia player of a social network portal according to some implementations.

FIG. 18 is yet another example of a graphical user interface of a multimedia player of a social network portal according to another implementation. Similar to the multimedia player 1502 shown in FIG. 15, the multimedia player 1502 of FIG. 16 also includes multimedia content 1504. In this example, the multimedia player 1502 also displays events data 1802 associated with the multimedia content 1504.

Figure 19:
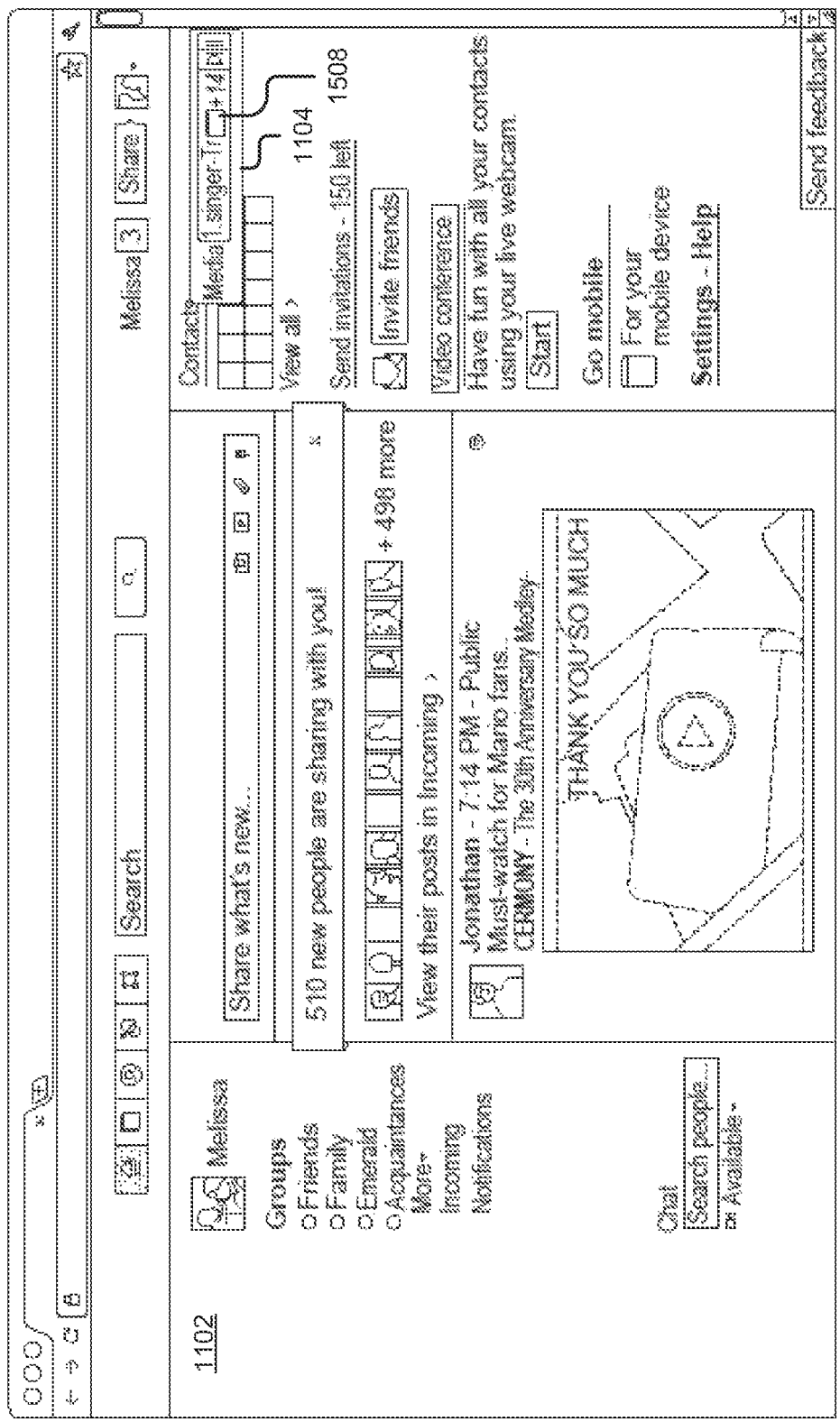
FIG. 19 is an example of a graphical user interface of a social network portal with an integrated multimedia controller according to some implementations.

FIG. 19 is example of a graphical user interface of a social network portal 1102 with an integrated multimedia controller 1104 according to one implementation. The integrated media controller 1104 is a feature included within the social network portal and provides media playing capabilities within the social network portal 1102. In other words, a user can control the playback of media from activation or selection of the integrated media controller 1104 of the social network portal 1102. As illustrated in this FIG. 19, the integrated media controller 1104 includes a search query input field 1508, which is displaying the name associated with the multimedia content that is currently streaming. In this example, the "now playing" lists "Singer."

Figure 20:
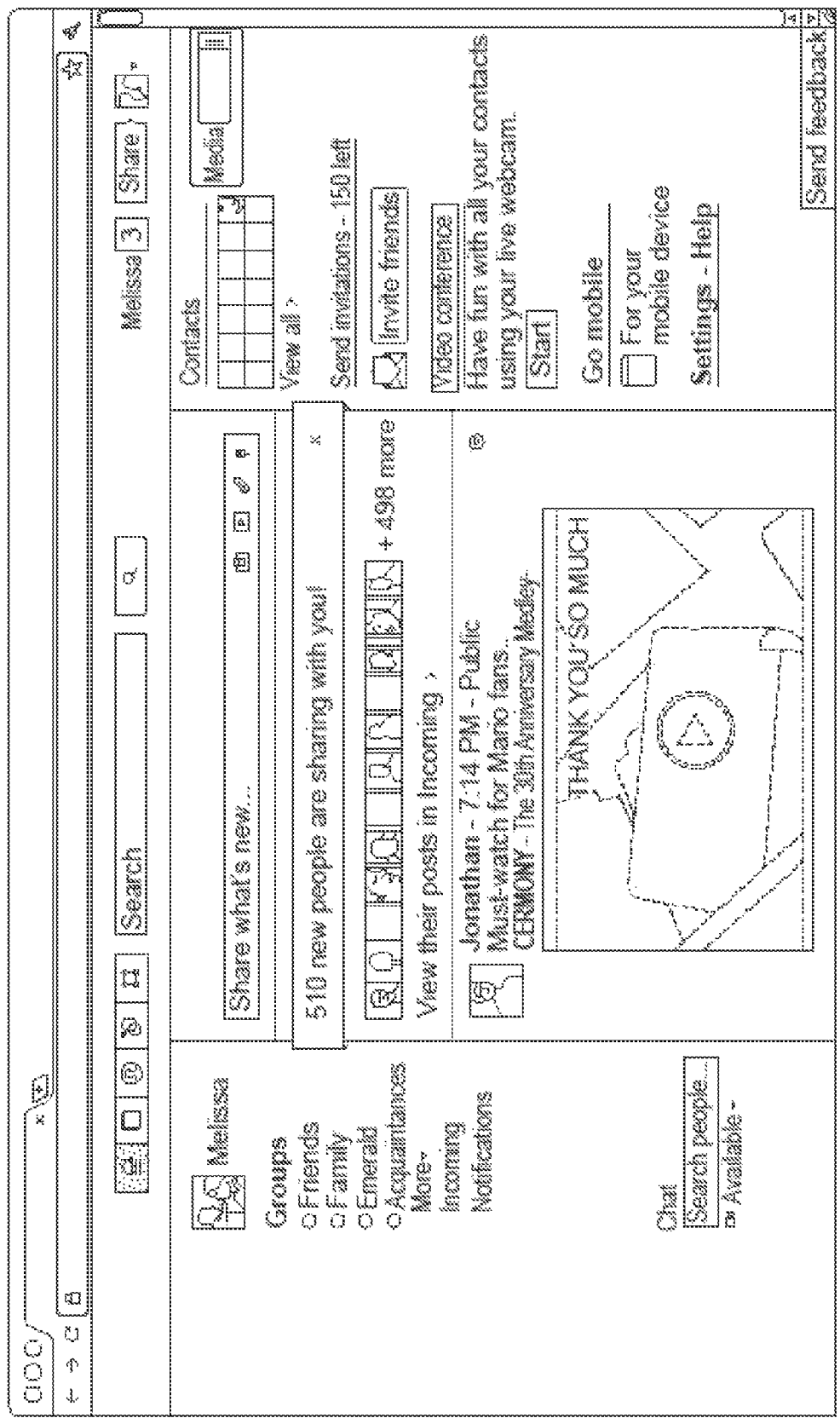
FIG. 20 is another example of a graphical user interface of a social network portal with an integrated multimedia controller illustrating activation of the multimedia controller according to some implementations.

FIG. 20 is another example of a graphical user interface of a social network portal with an integrated multimedia controller illustrating activation of the multimedia controller according to one implementation.

Figure 21:
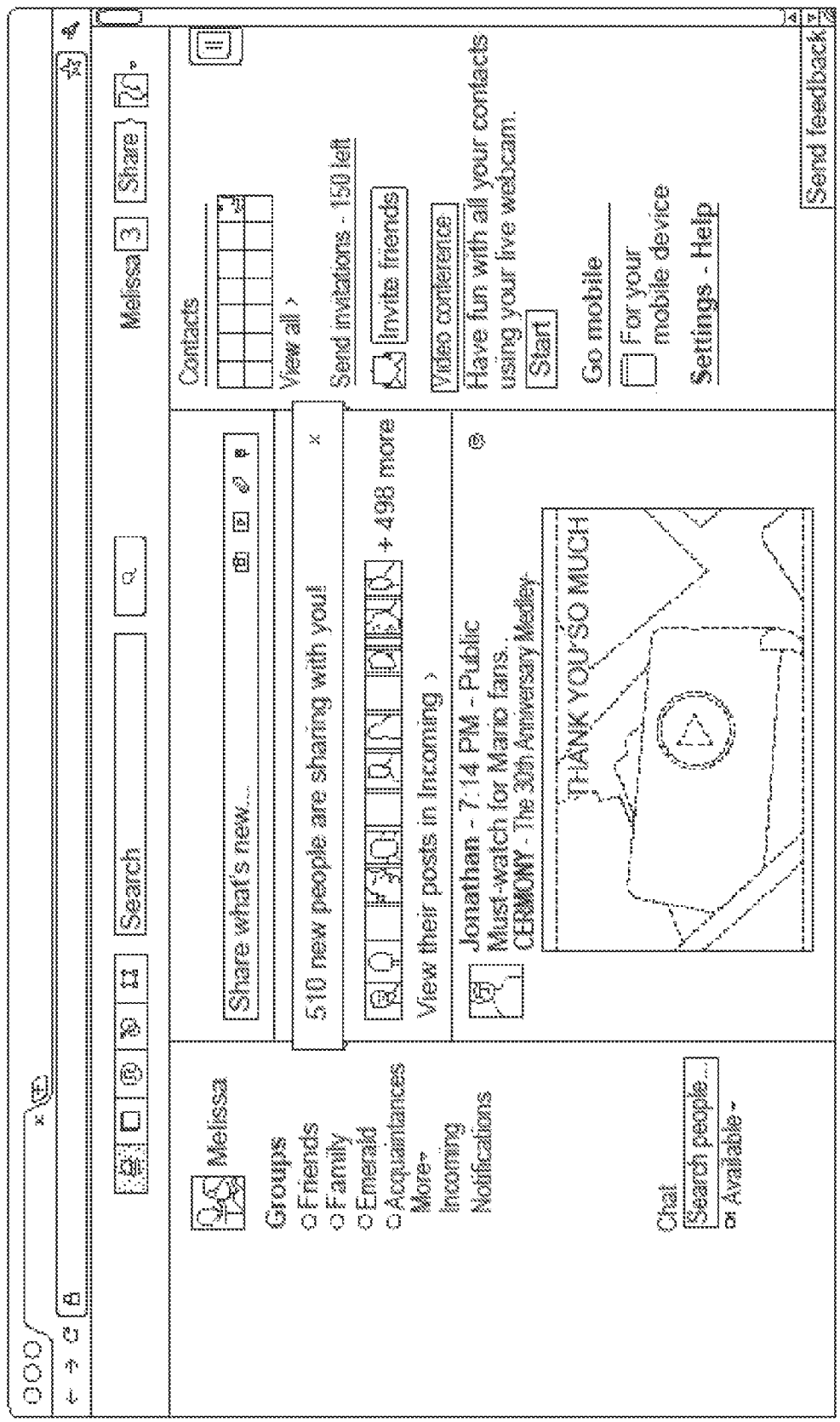
FIG. 21 is example of a graphical user interface of a social network portal with an integrated multimedia controller according to some implementations.

FIG. 21 is example of a graphical user interface of a social network portal with an integrated multimedia controller according to another implementation.

In some implementations, the multimedia controller of the social network portal can be used to control other media playing applications. In some implementations, the other application may be available on a third party server and available through a third party website. In some implementations, when there are two or more media-playing applications running at the same time, the media controller may disable (or cause to pause) one of the media-playing applications, thereby ensuring that only one media-playing application is running at one time. In some implementations, when there are two or more applications that produce an audio signal running at the same time, the media controller may disable (or cause to pause) one of the applications, thereby ensuring that only one application is producing audio at a time.

In some implementation, users can consent to the storing of their search results and information about what multimedia content they have selected, listened to or viewed. This user-consenting information may be stored and analyzed to determine suggestions to the user of multimedia content that the user may be interested in based on multimedia content that the user has previously searched for, viewed or listened to. In some implementations, multimedia content may be suggested to the user based on any number of signals, including but not limited to, what the user has watched or listened to previously, a determination of similar multimedia to what the user has previously watched, content related to what topics the user is interested in, content the user's contacts (friends) on the social networking site watch (or similar content to that), content targeted to a specific demographic, etc.

In some implementations, a multi-party communication space may be integrated into the social network portal with integrated multimedia playback. The communication space may be used to build collaborative playlists and allow users in the communication space to simultaneously listen to the same multimedia content from different user devices. In some implementations, these users in the communication space can each contribute to the playlist and by searching for multimedia content. In some implementations, subgroups within the multi-party communication space may be created based on a shared playlist and the users within the subgroups can listen to or watch multimedia content on the shared playlist simultaneously. In some implementations, playlists are created in the manner described above and may be accessed remotely via a mobile device and edited remotely via the mobile device.

The foregoing data/information can be collected upon user consent for generating, e.g., prediction models. In some implementations, a user can be prompted to explicitly allow data collection. Further, the user may opt in/out of participating in such data collection activities. Furthermore, the collected data can be anonymized prior to performing the analysis to obtain the various statistical patterns described above The foregoing description of the implementations of the present disclosure has been presented for the purposes of illustration and description. It is not intended to be exhaustive or to limit the present implementations to the precise form disclosed. Many modifications and variations are possible in light of the above teaching. It is intended that the scope of the present implementations be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present implementations or its features may have different names, divisions and/or formats. Furthermore, as will be apparent to one of ordinary skill in the relevant art, the modules, routines, features, attributes, methodologies and other aspects of the present implementations can be implemented as software, hardware, firmware or any combination of the three. Also, wherever a component, an example of which is a module, of the present implementations are implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present implementations are in no way limited to implementation in any specific programming language, or for any specific operating system or environment. Accordingly, the disclosure of implementations is intended to be illustrative, but not limiting, of the scope set forth in the following claims.

What is claimed is:

1. A computer-implemented method comprising:
hosting, on the one or more computing devices, a social network webpage of a user, wherein the user can view a social network associated with the social network webpage via the social network webpage, and wherein the social network webpage displays a social network content stream and information related to an account for the user on the social network together with search results within the social network content stream;
integrating, on the social network webpage of the user, a multimedia controller, wherein a selection of the multimedia controller controls an integrated multimedia player; and
enabling the user to simultaneously navigate the social network webpage and stream multimedia content via the integrated multimedia player, the integrated multimedia controller, upon determination that multiple social network webpages are open, the multiple social network webpages including a first social network webpage associated with the user and a second social network webpage associated with another user, synchronizing the multimedia content streamed via the integrated multimedia player, from a playlist built in collaboration between the user and another user via a communication space integrated into the social network webpage, such that the multimedia content is synched across the first social network webpage associated with the user and the second social network webpage associated with the another user for playback to the user and the another user at the same time.

2. The computer-implemented method of claim 1, wherein the search results include two or more multimedia items, wherein a multimedia item includes one or more of audio content and video content.

3. The computer-implemented method of claim 1, further comprising:
receiving a request from a user device via the multimedia controller;
processing the request, wherein the request includes at least one term associated with multimedia content;
generating at least one result based on the request, wherein the at least one result includes associated multimedia content; and
sending the generated result, including the associated multimedia content for display on the social network webpage of the user.

4. The computer-implemented method of claim 1, further comprising:
generating, in a separate browser window, the integrated multimedia player, wherein a launch of the integrated multimedia player was initiated upon selection of an area of the social network webpage of the user.

5. The computer-implemented method of claim 1, further comprising:
enabling, on the social network webpage of the user, sharing of multimedia content played on the integrated multimedia player.

6. The computer-implemented method of claim 1, wherein the multimedia controller is able to control another media player that is running so that only audio from multimedia content being played by the multimedia controller is audible to the user.

7. The computer-implemented method of claim 1, further comprising:
receiving, from a user via a client device, a search query input into a search field;
comparing at least one term of the search query to a plurality of predefined terms; and
generating, responsive to determining that the at least one term of the search query matches a term in the plurality of terms, the search results, the search results including at least one multimedia content item.

8. A system comprising:
one or more processors; and
a memory storing instructions that, when executed by the one or more processors, cause the system to:
host a social network webpage of a user, wherein the user can view a social network associated with the social network webpage via the social network webpage, and wherein the social network webpage displays a social network content stream and information related to an account for the user on the social network together with search results within the social network content stream;
integrate, on the social network webpage of the user, a multimedia controller, wherein a selection of the multimedia controller controls an integrated multimedia player; and
enable the user to simultaneously navigate the social network webpage and stream multimedia content via the integrated multimedia controller, the integrated multimedia controller, upon determination that multiple social network webpages are open, the multiple social network webpages including a first social network webpage associated with the user and a second social network webpage associated with another user, synchronizing the multimedia content streamed via the integrated multimedia player, from a playlist built in collaboration between the user and another user via a communication space integrated into the social network webpage, such that the multimedia content is synched across the first social network webpage associated with the user and the second social network webpage associated with the another user for playback to the user and the another user at the same time.

9. The system of claim 8, wherein the search results include two or more multimedia items, wherein a multimedia item includes one or more of audio content and video content.

10. The system of claim 8, wherein the instructions, when executed by the one or more processors, cause the system to:
receive a request from a user device via the multimedia controller;
process the request, wherein the request includes at least one term associated with multimedia content;
generate at least one result based on the request, wherein the at least one result includes associated multimedia content; and
send the generated result, including the associated multimedia content for display on the social network webpage of the user.

11. The system of claim 8, wherein the instructions, when executed by the one or more processors, cause the system to generate, in a separate browser window, the integrated multimedia player, wherein the launch of the integrated multimedia player was initiated upon selection of an area of the social network webpage of the user.

12. The system of claim 8, wherein the instructions, when executed by the one or more processors, cause the system to enable sharing on the social network webpage of the user, multimedia content played on the integrated multimedia player.

13. A computer program product comprising a non-transitory computer usable medium including a computer readable program, wherein the computer readable program when executed on a computer causes the computer to:

host a social network webpage of a user, wherein the user can view a social network associated with the social network webpage via the social network webpage, and wherein the social network webpage displays a social network content stream and information related to an account for the user on the social network together with search results within the social network content stream;

integrate a multimedia controller, wherein a selection of the multimedia controller controls an integrated multimedia player; and enable the user to simultaneously navigate the social network webpage and stream multimedia content via the integrated multimedia player, the integrated multimedia controller, upon determination that multiple social network webpages are open, the multiple social network webpages including a first social network webpage associated with the user and a second social network webpage associated with another user, synchronizing the multimedia content streamed via the integrated multimedia player, from a playlist built in collaboration between the user and another user via a communication space integrated into the social network webpage, such that the multimedia content is synched across the first social network webpage associated with the user and the second social network webpage associated with the another user for playback to the user and the another user at the same time.

14. The computer program product of claim 13, wherein the computer readable program when executed on a computer also causes the computer to:

receive a request from a user device via the multimedia controller;

process the request, wherein the request includes at least one term associated with multimedia content;

generate at least one result based on the request, wherein the at least one result includes associated multimedia content; and send the generated result, including the associated multimedia content for display on the social network webpage of the user.

15. The computer program product of claim 13, wherein the computer readable program when executed on a computer also causes the computer to:

generate, in a separate browser window, the integrated multimedia player, wherein a launch of the integrated multimedia player was initiated upon selection of an area of the social network webpage of the user.

16. The computer program product of claim 13, wherein the computer readable program when executed on a computer also causes the computer to:

enable sharing on the social network webpage of the user, multimedia content played on the integrated multimedia player.

* * * * *